United States Patent [19]

Yoshioka et al.

[11] Patent Number: 5,540,298

[45] Date of Patent: Jul. 30, 1996

[54] INTEGRATED CONTROLLER FOR VEHICLE

[75] Inventors: Tohru Yoshioka; Kenichi Okuda; Hiroki Uemura; Yasunori Yamamoto; Tomohiko Adachi; Tetsuro Butsuen; Toshihiro Hara; Kazuki Fujise, all of Hiroshima-ken, Japan

[73] Assignee: Mazda Motor Corporation, Hiroshima-ken, Japan

[21] Appl. No.: 302,239

[22] Filed: Sep. 7, 1994

Related U.S. Application Data

[63] Continuation of Ser. No. 946,063, Sep. 18, 1992, abandoned.

[30] Foreign Application Priority Data

Sep. 19, 1991 [JP] Japan ..................... 3-239927

[51] Int. Cl.$^6$ ........................................ B60T 7/12
[52] U.S. Cl. ............... 180/169; 364/424.02; 364/426.01; 364/461; 303/193
[58] Field of Search ..................... 180/169, 167, 180/271; 340/903, 904; 342/70, 71, 72; 364/424.01, 461, 424.02, 426.01; 303/95, 97, 100

[56] References Cited

U.S. PATENT DOCUMENTS

| | | | |
|---|---|---|---|
| 4,073,359 | 2/1978 | Fujiki et al. | 342/71 |
| 4,097,864 | 6/1978 | Endo et al. | 342/71 |
| 4,104,632 | 8/1978 | Fujiki et al. | 342/71 |
| 4,402,375 | 9/1983 | Glaze | 180/169 |
| 4,673,937 | 6/1987 | Davis | 342/71 |
| 4,692,764 | 9/1987 | Bonar | 342/71 |
| 5,107,946 | 4/1992 | Kamimura et al. | 180/169 |
| 5,163,002 | 11/1992 | Kurami | 180/169 |
| 5,233,527 | 8/1993 | Shinnosuke | 180/169 |
| 5,234,070 | 8/1993 | Noah et al. | 180/169 |
| 5,243,524 | 9/1993 | Ishida et al. | 180/169 |
| 5,314,037 | 5/1994 | Shaw et al. | 180/169 |
| 5,332,056 | 7/1994 | Niibe et al. | 180/169 |
| 5,332,057 | 7/1994 | Butsuen et al. | 180/169 |

FOREIGN PATENT DOCUMENTS

| | | | |
|---|---|---|---|
| 58319 | 3/1993 | Japan | 180/167 |
| 50930 | 3/1993 | Japan | 180/167 |

Primary Examiner—Margaret A. Focarino
Assistant Examiner—Kevin Hurley
Attorney, Agent, or Firm—Sixbey, Friedman, Leedom & Ferguson, P.C.; Gerald J. Ferguson, Jr.; Donald R. Studebaker

[57] ABSTRACT

An integrated controller for a vehicle comprises a contact preventive device for detecting a distance between a vehicle and an obstacle and a relative speed, and deciding whether the vehicle may come in contact with the obstacle based on the results of detection so as to perform automatic braking or automatic steering, and a characteristic changing device for causing the suspension or steering characteristic of the vehicle to be changed. The control part of the characteristic changing device changes the suspension or steering characteristic based on information from the control part of the contact preventive device when operating the contact preventive device. In case the characteristic changing device is an active suspension device, the control part changes the suspension characteristic so as to increase a control gain when performing automatic braking and to inhibit the vehicle from being rolled when performing automatic steering. Consequently, it is possible to early change the suspension characteristic when operating the contact preventive device. Thus, the running stability of the vehicle can be enhanced.

18 Claims, 35 Drawing Sheets

INTEGRATED CONTROLLER FOR VEHICLE

This application is a Continuation of Ser. No. 07/946,963, filed Sep. 18, 1992, now abandoned.

BACKGROUND OF THE INVENTION

The present invention relates to an integrated controller for a vehicle having a contact preventive device for automatically preventing a vehicle from coming in contact with an obstacle and a device for changing the suspension or steering characteristic of the vehicle.

By way of example, Japanese Patent Publication Nos. 2565/1964 and 5668/1964 have disclosed a contact preventive device for a vehicle in which a distance between a vehicle and a forward obstacle and a relative speed are continuously detected by means of a radar device or the like, it is decided whether there is a possibility of contact based on the distance and relative speed thus detected, and an actuator is operated to automatically brake each wheel for contact prevention if it is decided that there is the possibility of contact. There has also been known a contact preventive device for a vehicle in which wheels are automatically steered to prevent contact if it is decided that there is the possibility of contact (see Japanese Unexamined Patent Publication No. 24008/1989).

Conventionally, a vehicle has been provided with various devices which can change a suspension or steering characteristic such as an active suspension device (ACS device), an antiskid braking device (ABS device), a four wheel steering device (4WS device) and the like. The ACS device feeds and discharges a fluid to and from a cylinder provided between a body and each wheel so that the suspension characteristic can be changed.

When automatic braking or automatic steering is performed in the contact preventive device, the vehicle may easily be unstable. Consequently, it is desired that a device such as an ACS device which can change the suspension or steering characteristic is provided together with the contact preventive device. In this case, however, the attitude of the vehicle cannot fully be stabilized if the suspension characteristic or the like is changed and controlled in consideration of the behavior of the vehicle (the change of attitude) caused by automatic braking or automatic steering in the ACS device or the like.

SUMMARY OF THE INVENTION

It is an object of the present invention to provide an integrated controller for a vehicle having a contact preventive device and a device such as an ACS device which can change a suspension or steering characteristic wherein the ACS device or the like early detects that the contact preventive device performs automatic braking or automatic steering for contact prevention to change the suspension characteristic or the like so that the attitude of the vehicle can fully be stabilized.

In order to achieve the above-mentioned object, the present invention provides an integrated controller for a vehicle comprising a contact preventive device for detecting a distance between a vehicle and an obstacle and a relative speed, and deciding whether the vehicle may come in contact with the obstacle based on the results of detection so as to perform contact prevention, and characteristic changing means for causing the suspension or steering characteristic of the vehicle to be changed, wherein the characteristic changing means includes a control part for changing the suspension or steering characteristic based on information from a control part of the contact preventive device when operating the contact preventive device.

With the above-mentioned structure, the control part of the characteristic changing means early receives information from the control part of the contact preventive device when operating the contact preventive device, and changes the suspension or steering characteristic of the vehicle almost simultaneously with automatic braking or automatic steering for contact prevention. As a result, it is possible to effectively inhibit the behavior of the vehicle caused by the operation of the contact preventive device. Consequently, running stability can be enhanced.

This and other objects, features and advantages of the present invention will become more apparent upon a reading of the following detailed description and drawings.

BRIEF DESCRIPTION OF THE DRAWINGS

Preferred embodiments of the present invention are illustrated in the drawings, in which:

FIG. 1 is a hydraulic circuit diagram of an automatic braking device for a vehicle;

FIG. 2 is a view showing the arrangement of components of a hydraulic circuit of the automatic braking device;

FIG. 3 is a block diagram showing the automatic braking device;

FIG. 4 is a flow chart showing the control flow of automatic braking for contact prevention;

FIG. 5 is a diagram showing a map for calculating thresholds;

FIG. 6 is a typical diagram showing the schematic structure of an antiskid braking device;

FIG. 7 is a hydraulic circuit diagram of the antiskid braking device;

FIGS. 8 to 11 are control block diagrams showing the variable control of a suspension characteristic;

FIG. 12 is a flow chart showing the change control of the suspension characteristic;

FIG. 13 is a characteristic chart showing the change of a tire ground load by simulation;

FIG. 14 is a characteristic chart showing the change of a tire displacement;

FIG. 15 is a typical view showing the overall structure of an automatic steering device for a vehicle;

FIG. 16 is a flow chart showing the control flow of automatic steering for contact prevention;

FIG. 17 is a diagram showing the relationship between a vehicle and a forward vehicle;

FIG. 18 is a block diagram for calculating steering angles;

FIG. 19 is a diagram showing the relationship between a relative speed and a minimum distance between vehicles;

FIG. 20 is a diagram showing the relationship among a steering angle, a lateral moving distance and a passing time;

FIG. 21 is a flow chart showing the flow of corrective steering;

FIG. 22 is a diagram showing the overall structure of an antiskid braking device for a vehicle;

FIG. 23 is a flow chart showing the change control of a steering characteristic;

FIG. 24 is a flow chart showing a variant of the change control;

FIG. 25 is a diagram showing the relationship between a braking force and a slip ratio;

FIG. 26 is a flow chart showing another variant of the change control;

FIG. 27 is a typical diagram showing the overall structure of a four wheel steering device for a vehicle;

FIG. 28 is a characteristic chart showing the steering ratio of a rear wheel to a speed;

FIG. 29 is a characteristic chart showing the steering ratio of a rear wheel to a speed;

FIG. 30 is a flow chart showing the change control of a steering characteristic;

FIG. 31 is a typical diagram showing the overall structure of a steering device for a vehicle;

FIG. 32 is a plan view showing the structure of a drive mechanism of a toe control device with its part laid open;

FIG. 33 is a perspective view showing the drive mechanism;

FIG. 34 is a section view taken along the line X—X in FIG. 32;

FIG. 35 is a rear view showing the drive mechanism seen from the back of a cross member;

FIG. 36 is a perspective view of the drive mechanism in FIG. 35;

FIG. 37 is a diagram showing the relationship between a speed and a rear wheel steering angle; and FIG. 38 is an exploded perspective view showing an adjusting member.

DETAILED DESCRIPTION OF THE PREFERRED EMBODIMENTS

Preferred embodiment of the present invention will be described in detail with reference to the drawings.

Figure 1:
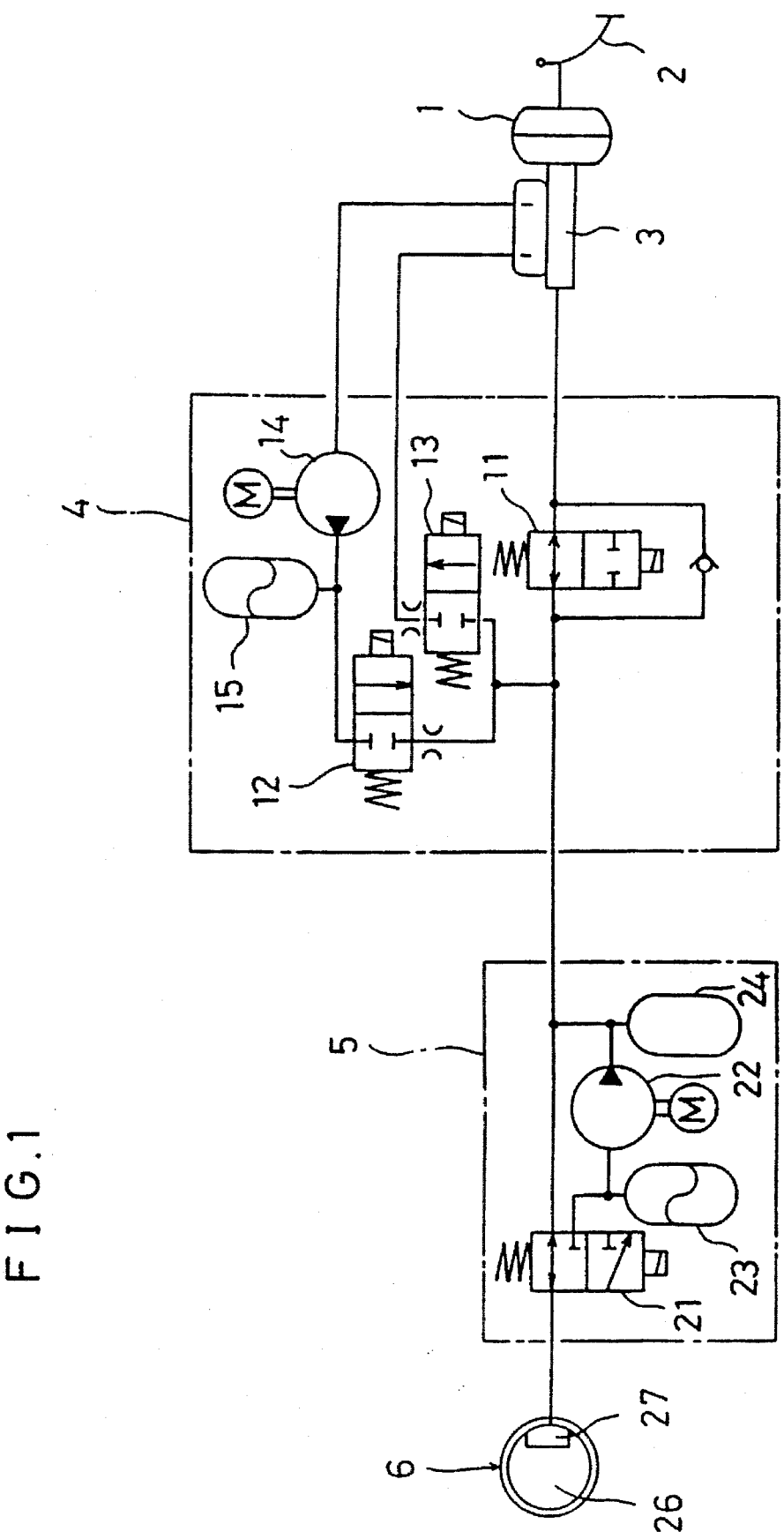
FIGS. 1 to 14 show a first embodiment.
Figure 2:
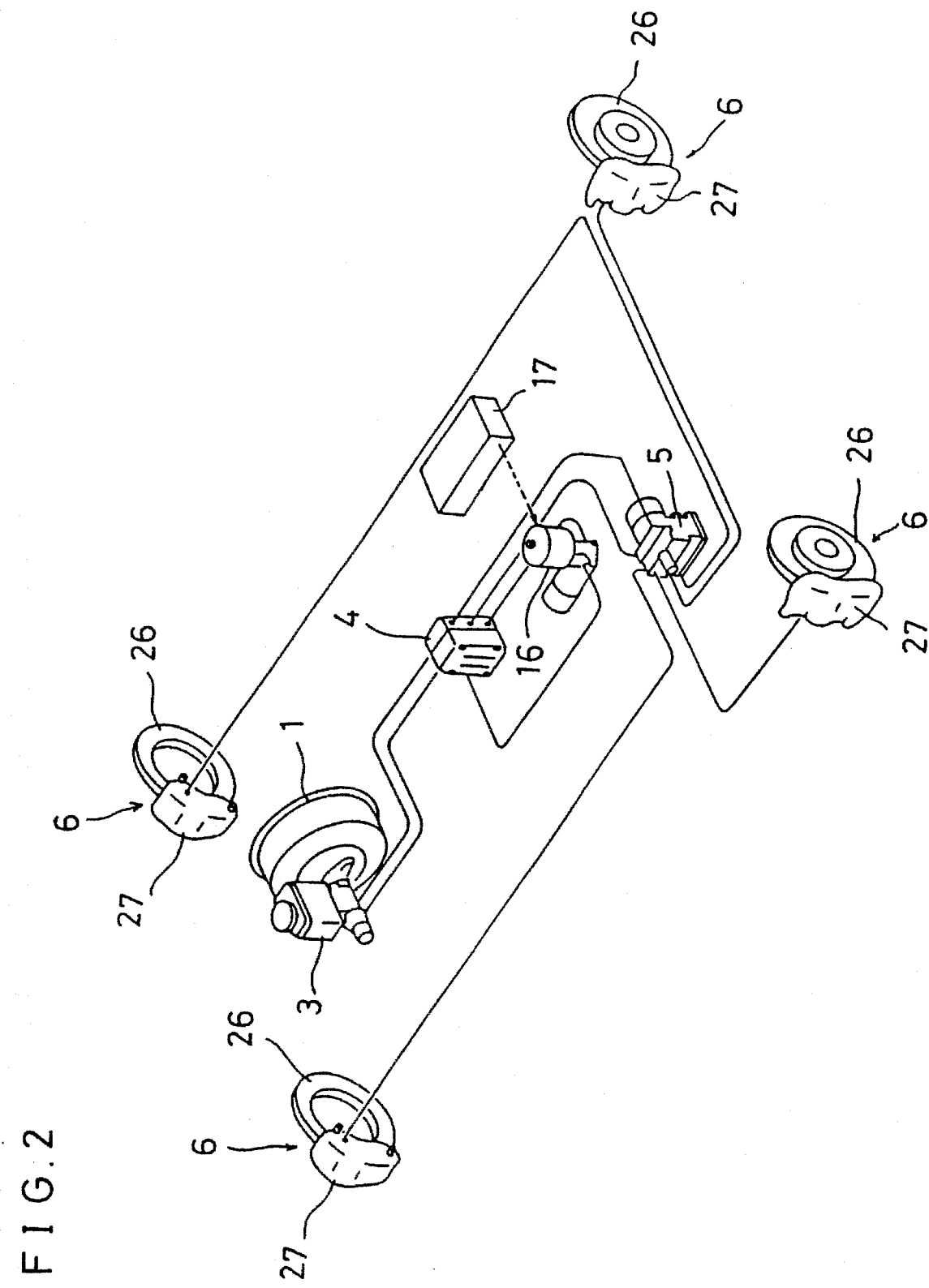
Figure 3:
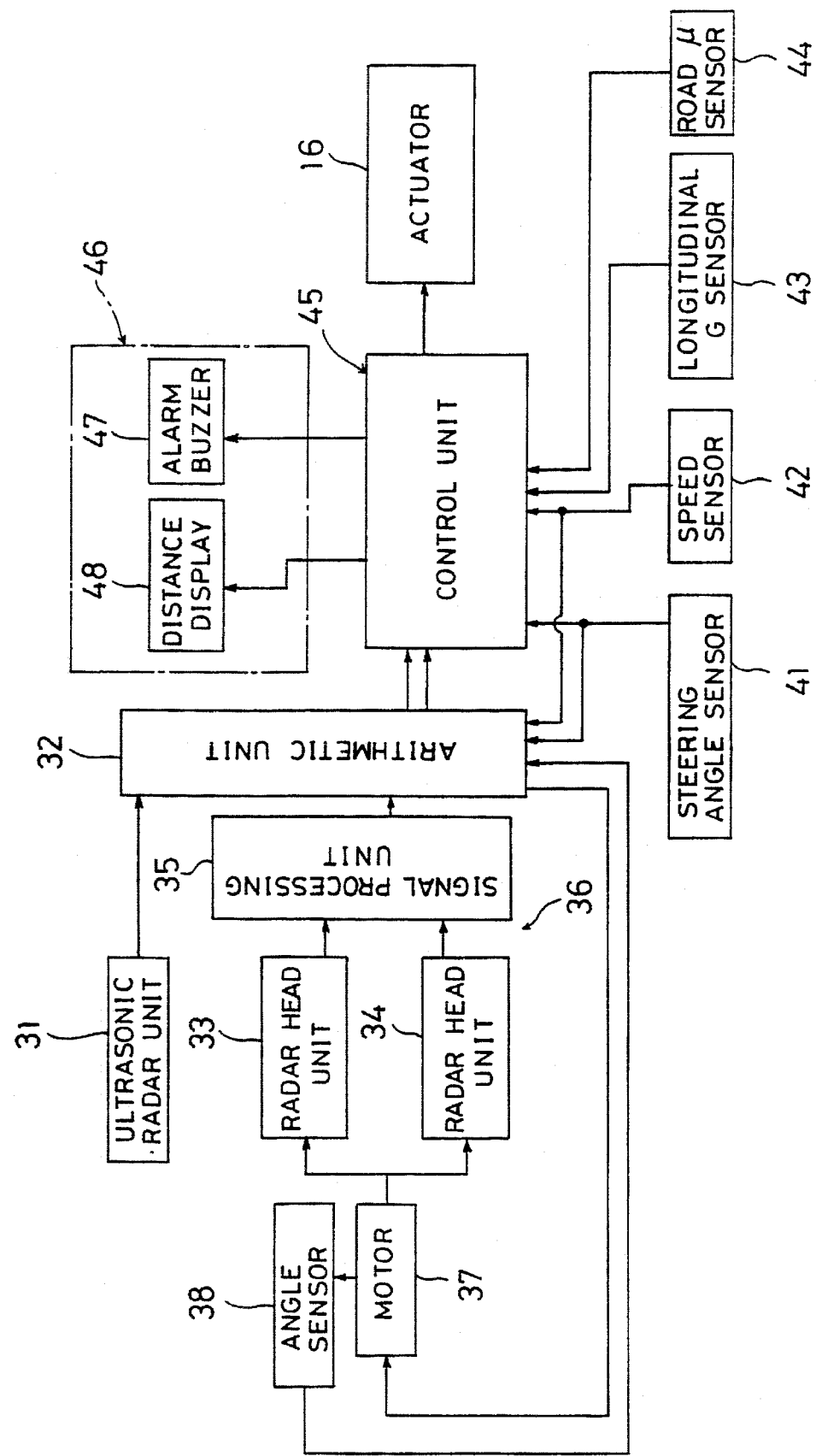

FIGS. 1 to 3 show an automatic braking device as a contact preventive device forming one of components of an integrated controller for a vehicle according to a first embodiment of the present invention. FIGS. 1 and 2 show the structure of a hydraulic circuit of the automatic braking device. FIG. 3 shows the block structure of the automatic braking device.

In FIGS. 1 and 2, the reference numeral 1 denotes a master vac for increasing the operating force of a brake pedal 2 generated by a driver, and the reference numeral 3 denotes a master cylinder for generating a braking pressure corresponding to the operating force increased by the master vac 1. The braking pressure generated by the master cylinder 3 is first fed to an automatic braking valve unit 4 and then to a braking device 6 for each wheel through an ABS (antiskid braking device) valve unit 5.

The automatic braking valve unit 4 includes a shutter valve 11, an intensifying valve 12 and a reducing valve 13. The shutter valve 11 blocks communication between the master cylinder 3 and the braking device 6 side. The valves 11 to 13 are electromagnetic 2-port 2-position switching valves. A motor driving oil pump 14 and an accumulator 15 are provided between the intensifying valve 12 and the master cylinder 3. The accumulator 15 serves to store pressure oil discharged from the oil pump 14 therein and hold the same at a constant pressure. When the shutter valve 11 is opened, braking is performed depending on the operating force of the brake pedal 2 by means of the braking device 6 for each wheel. When the shutter valve 11 is closed, the intensifying valve 12 is opened and the reducing valve 13 is closed, the pressure oil discharged from the accumulator 15 is fed to the braking device 6 so as to perform braking. When the intensifying valve 12 is closed and the reducing valve 13 is opened, the pressure oil is returned from the braking device 6 so that braking is reduced. The valves 11 to 13 are switched by an actuator 16 which includes a voltage supply for applying a voltage to the valves 11 to 13, and the like. The actuator 16 is controlled on receipt of a signal from a control box 17.

The ABS valve unit 5 includes a 3-port 2-position switching valve 21 which is provided for each wheel. When performing braking, the valve 21 performs switching to control a braking pressure applied to the braking device 6 so that the wheel is unlocked. The structure of the ABS valve unit 5 will not be described in detail. The ABS valve unit 5 also includes a motor driving oil pump 22, accumulators 23 and 24, and the like. The braking device 6 includes a disk 26 and a caliper 27. The disk 26 is rotated integrally with the wheel. The caliper 27 holds the disk 26 on receipt of a braking pressure from the master cylinder 3 side.

In FIG. 3, the reference numeral 31 denotes a ultrasonic radar unit provided on the front portion of a body. As is generally known, the ultrasonic radar unit 31 has a structure in which a transmitting portion transmits ultrasonic waves to an obstacle such as a forward vehicle, and a receiving portion receives waves reflected by the forward obstacle, which is not shown in detail. An arithmetic unit 32 receives a signal from the ultrasonic radar unit 31 and calculates a distance between a vehicle and a forward obstacle and a relative speed based on a lag time of radar receive waves behind a transmitting time. The reference numerals 33 and 34 denote a pair of radar head units provided on both sides of the front portion of the body. Each of the radar head units 33 and 34 has a structure in which a transmitting portion transmits pulse laser beams to a forward obstacle and a receiving portion receives light reflected by the forward obstacle. The arithmetic unit 32 receives signals from the radar head units 33 and 34 through a signal processing unit 35, and calculates a distance between the vehicle and the forward obstacle and a relative speed based on a lag time of laser receive beams behind a transmitting time. The arithmetic unit 32 gives priority to the arithmetic results of the distance and relative speed obtained by a system which employs the radar head units 33 and 34, and additionally uses the arithmetic results of the distance and relative speed obtained by a system which employs the ultrasonic radar unit 31. The ultrasonic radar unit 31, arithmetic unit 32, radar head units 33 and 34, and signal processing unit 35 form distance and relative speed detecting means 36 for detecting a distance between a vehicle and a forward obstacle, and a relative speed.

Directions in which pulse laser beams are transmitted from and received by the radar head units 33 and 34 can horizontally be changed by a motor 37. The actuation of the motor 37 is controlled by the arithmetic unit 32. The reference numeral 38 denotes an angle sensor for detecting the transmitting and receiving directions of the pulse laser beams based on the rotational angle of the motor 37. A detection signal generated by the angle sensor 38 is inputted to the arithmetic unit 32. The transmitting and receiving directions of the pulse laser beams are added to the calculation on the distance and relative speed performed by a system employing the radar head units 33 and 34 which is provided in the arithmetic unit 32.

The reference numeral 41 denotes a steering angle sensor for detecting a steering angle. The reference numeral 42 denotes a speed sensor for detecting a speed. The reference numeral 43 denotes a longitudinal G sensor for detecting a longitudinal acceleration (longitudinal G) of a vehicle. The reference numeral 44 denotes a road μ sensor for detecting a road friction coefficient (μ). Detection signals generated by the sensors 41 to 44 are inputted to a control unit 45. The control unit 45 serves to control the actuator 16. The control unit 45 also receives signals of the distance between a vehicle and a forward obstacle and of the relative speed which are obtained by the arithmetic unit 32. The control unit 45 and arithmetic unit 32 are housed in the control box 17 (see FIG. 2). The reference numeral 46 denotes an alarm display unit which is provided on an interior instrument panel. The alarm display unit 46 includes an alarm buzzer 47 and a distance display portion 48 which receive signals from the control unit 45 respectively.

Figure 4:
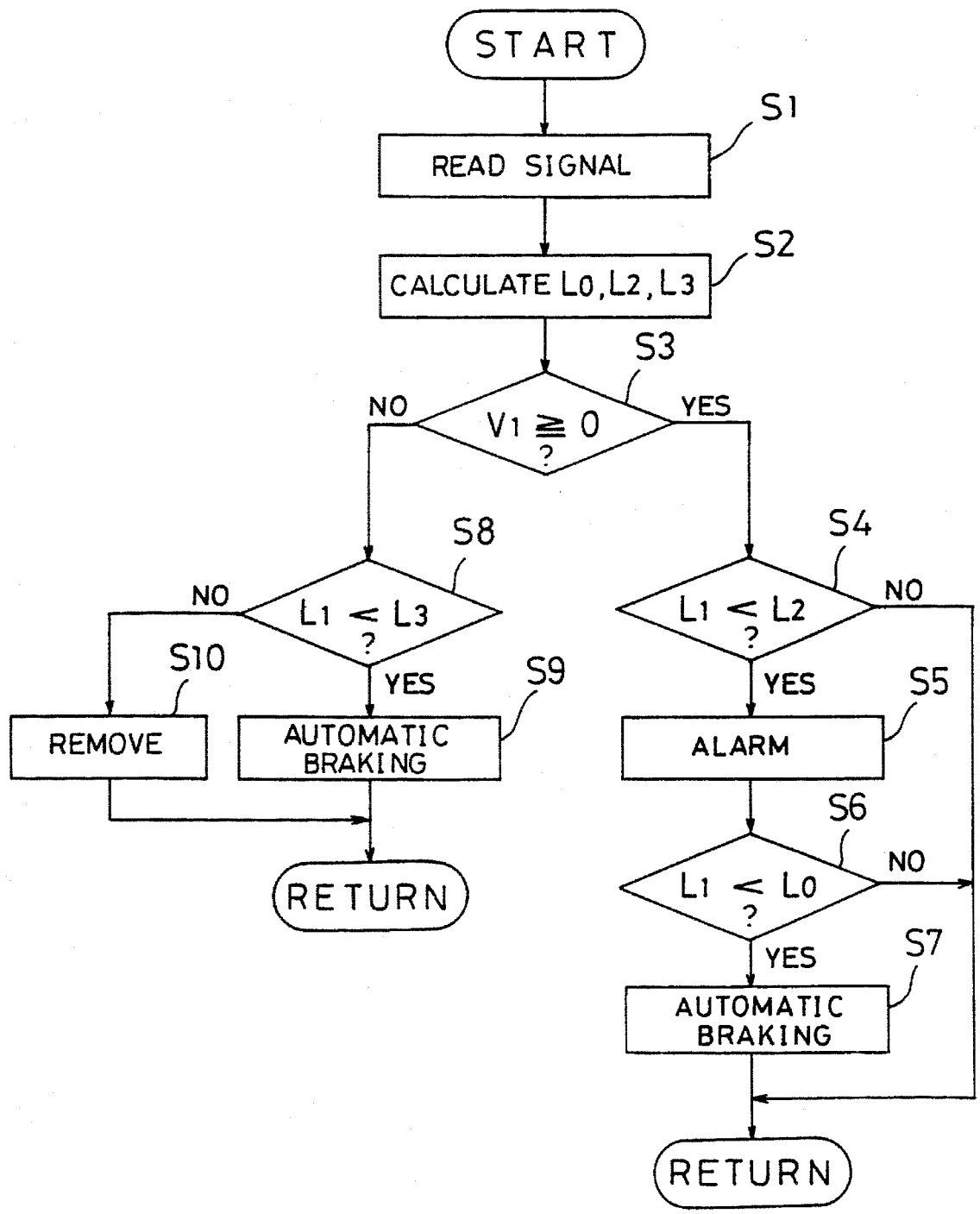

FIG. 4 shows the control flow of automatic braking for contact prevention performed by the control unit 45. In the control flow, various signals are first read at Step S1, and thresholds L0, L2 and L3 are calculated at Step S2. The threshold L0 is a distance between a vehicle and a forward obstacle at which the vehicle may come in contact with the forward obstacle so that automatic braking is started to prevent contact. The threshold L0 is calculated according to a threshold map shown in FIG. 5. The threshold L2 is a distance between the vehicle and the forward obstacle at which an alarm is raised prior to automatic braking start, and is set greater than the threshold L0 by a predetermined amount. The threshold L3 is a distance between the vehicle and the forward obstacle at which a possibility of contact is eliminated after automatic braking start so that automatic braking is removed, and is set greater than the threshold L0 by a predetermined amount or smaller than the threshold L0 by a predetermined amount as the case may be.

Figure 5:
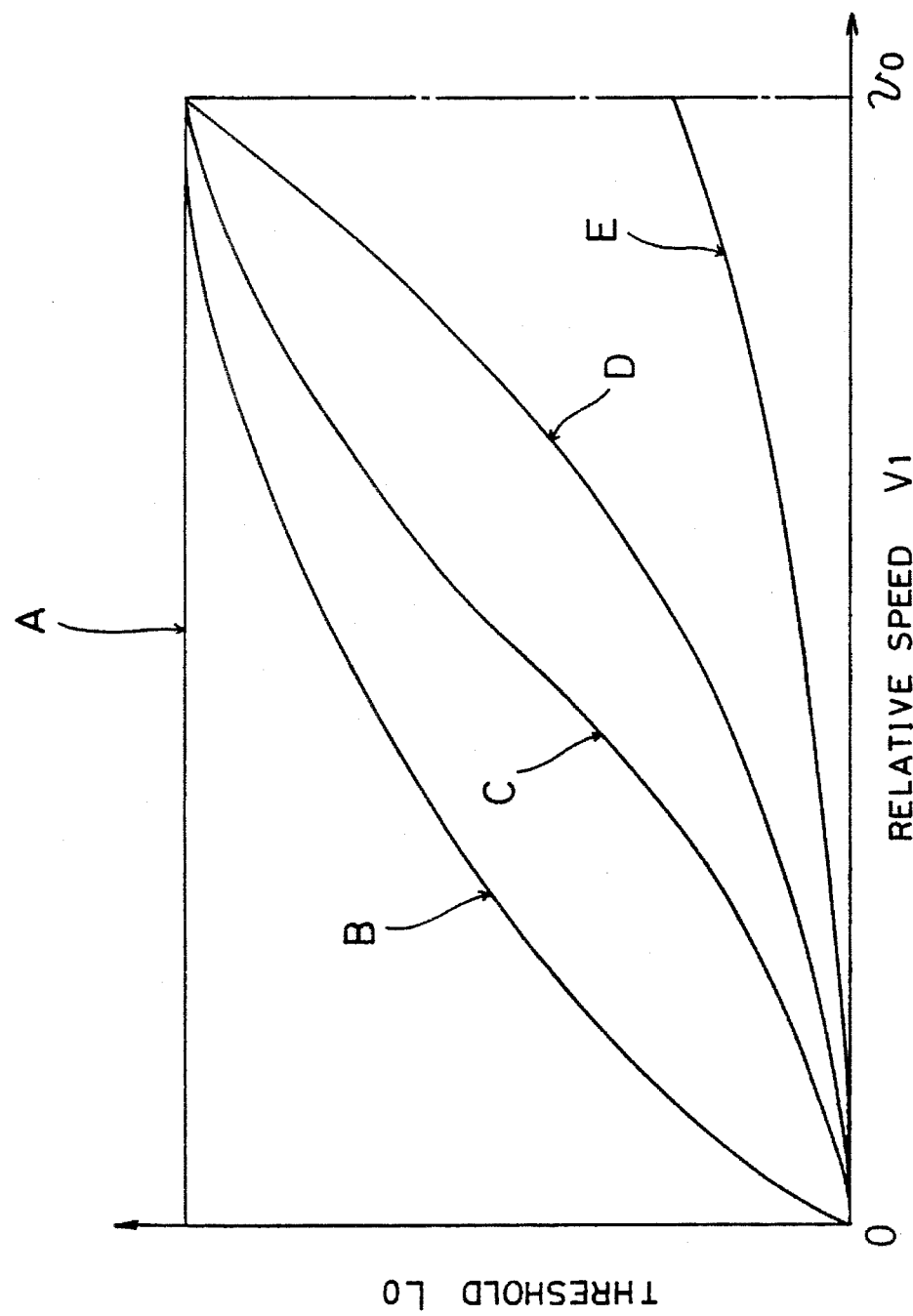

There will be described the threshold map shown in FIG. 5. In the threshold map, a threshold line A represents a distance between vehicles necessary to prevent the vehicle from coming in contact with the forward vehicle when the forward vehicle comes in contact with the forward obstacle and stops. In similar to the case where the forward obstacle is a stopping object (that is, a relative speed V1 is equal to a speed v0 of the vehicle), the distance between vehicles has a value of $v0^2/2$ μg irrespective of the relative speed V1 when the forward obstacle is a moving object. A threshold line B represents a distance between vehicles [a numerical formula of $V1 \cdot (2v0-V1)/2$ μg] necessary to prevent the vehicle from coming in contact with the forward vehicle when the forward vehicle performs full-braking. A threshold line C represents a distance between vehicles necessary to prevent the vehicle from coming in contact with the forward vehicle when the forward vehicle performs gentle braking at a decceleration of μ/2 g. A threshold line D represents a distance between vehicles (a numerical formula of $V1^2/2$ μg) necessary to prevent the vehicle from coming in contact with the forward vehicle when the forward vehicle has a constant speed. A threshold line E represents a distance between vehicles at which the vehicle cannot be prevented from coming in contact with the forward vehicle by performing automatic braking but an impact force can be reduced at the time of contact. In the present embodiment, the threshold line B is selected. The threshold L0 corresponding to the relative speed V1 at the present time is obtained by the threshold line B.

After the thresholds L0, L2 and L3 are calculated, it is decided whether a relative speed V1 of the vehicle to the forward obstacle is equal to or greater than 0, that is, they are approaching each other at Step S3. If decision is YES, it is decided whether a distance L1 between the vehicle and the forward obstacle is smaller than the threshold L2 at Step S4. If decision is YES, the alarm buzzer 47 is sounded at Step S5. At Step S6, it is decided whether the distance L1 is smaller than the threshold L0. If decision is YES, the actuator 16 is operated to perform automatic full-braking at Step S7. Then, this routine returns. If decision is NO in Step S4 or S6, this routine immediately returns.

If decision is NO in Step S3, that is, the vehicle and the forward obstacle (forward vehicle) are getting away from each other, it is decided whether the distance L1 is smaller than the threshold L3 at Step S8. If decision is YES, this routine returns while automatic braking is performed at Step S9. If decision is NO, automatic braking is removed at Step S10 and this routine then returns.

In the automatic braking device, the distance and relative speed detecting means 36 including the radar head unit 31 and the like detects the distance L0 and the relative speed while the vehicle is running. When the vehicle approaches the forward obstacle based on the results of detection so that the distance L1 is made smaller than the threshold L0, the control unit 45 operates the actuator 16. Consequently, the valves of the automatic braking valve unit 4 are switched through a voltage generated by the actuator 16 so that automatic braking is performed. More specifically, the shutter valve 11 is closed, the intensifying valve 12 is opened and the reducing valve 13 is closed. Consequently, pressure oil is fed from the accumulator 15 to the braking device 6 (caliper 27) for each wheel so that a full-braking force is applied to the wheel by the operation of the braking device 6. As a result, it is possible to prevent the vehicle from coming in contact with the forward obstacle.

Figure 6:
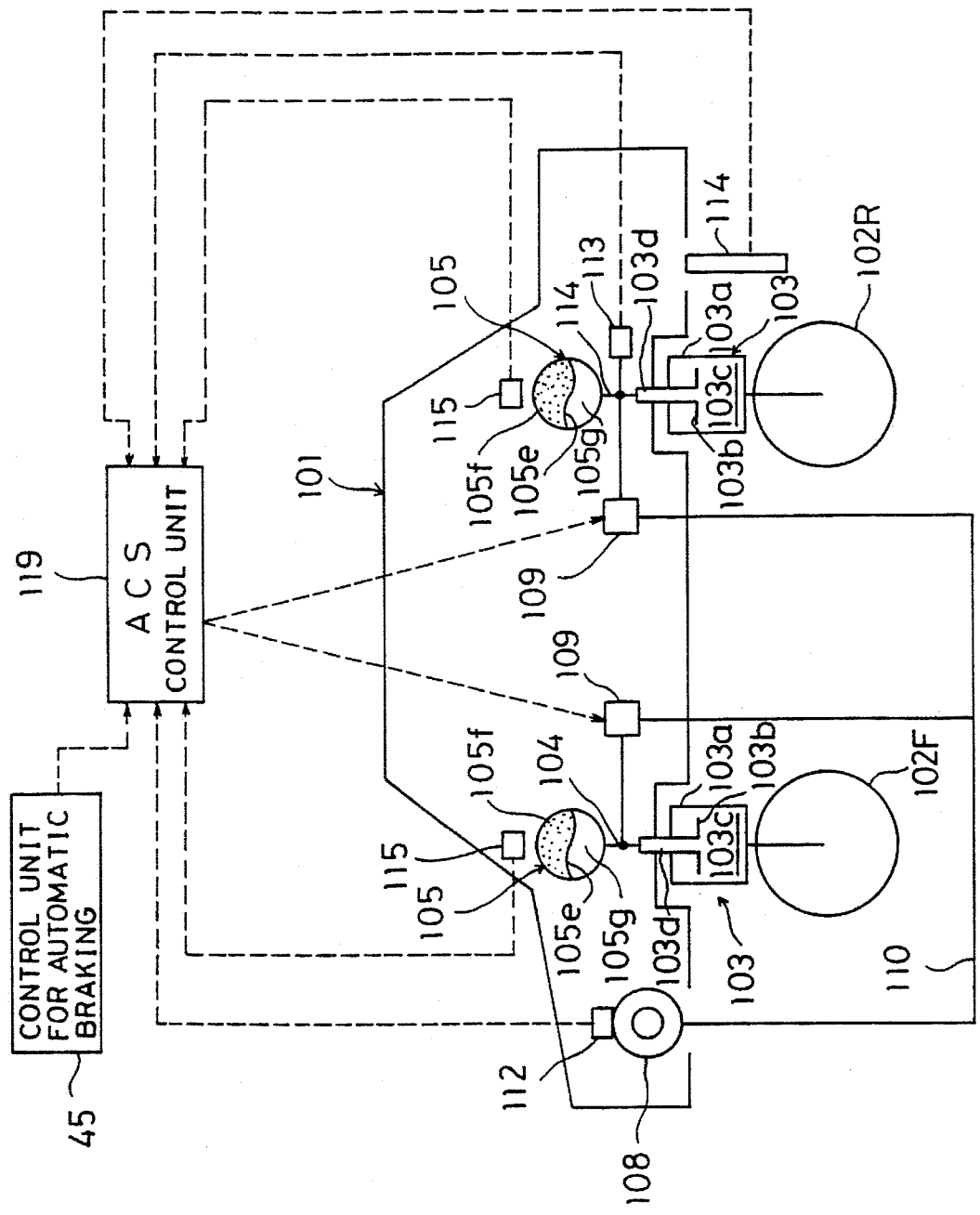
Figure 7:
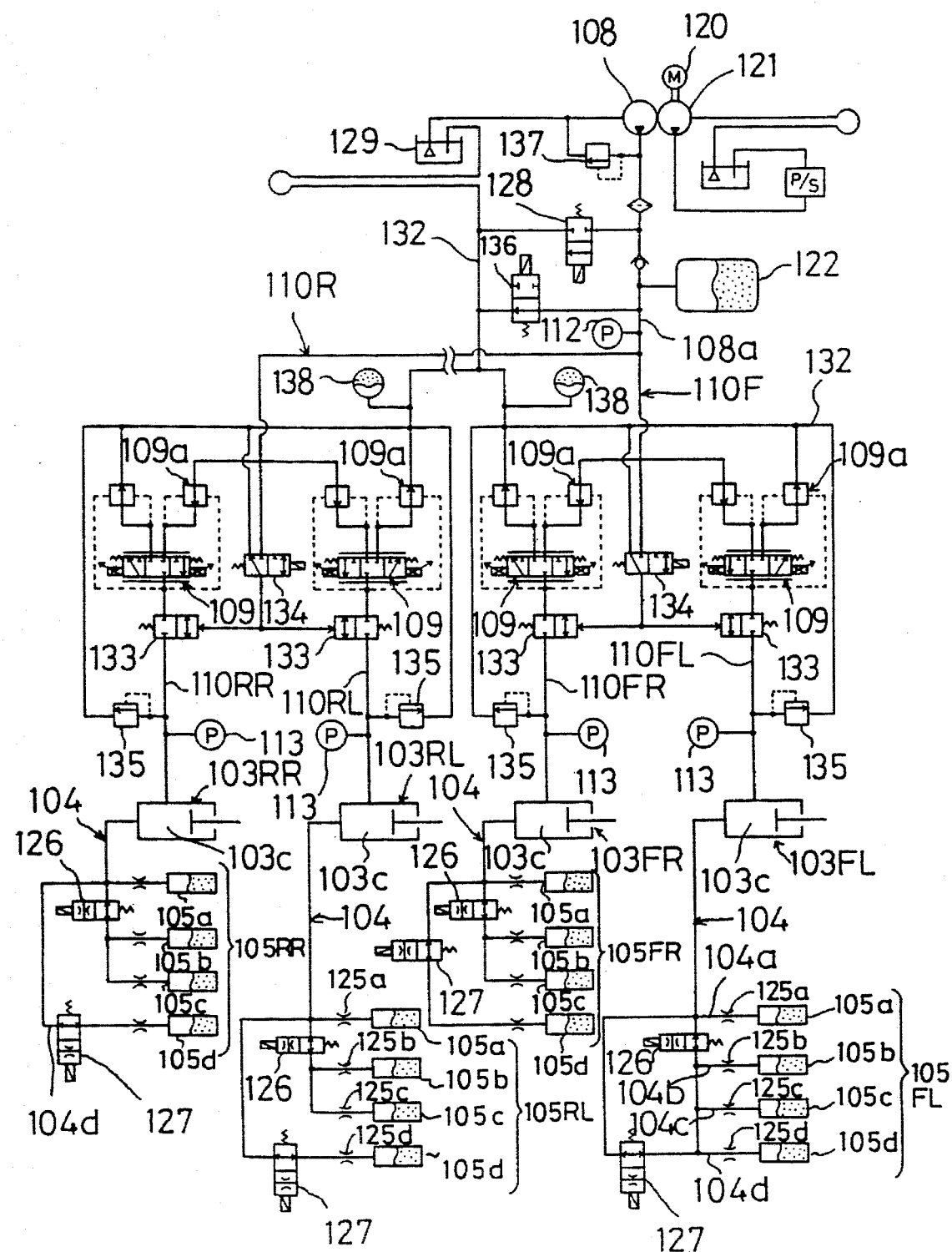

FIGS. 6 and 7 show an active suspension device (ACS device) for a vehicle forming, together with the automatic braking device, the integrated controller for the vehicle according to the first embodiment of the present invention. FIG. 6 shows the schematic overall structure of the ACS device. FIG. 7 shows a hydraulic circuit of the ACS device.

In FIG. 6, the reference numeral 101 denotes a body, the reference numeral 102F denotes a front wheel and the reference numeral 102R denotes a rear wheel. Fluid cylinders 103 are provided between the body 101 and the front wheel 102F and between the body 101 and the rear wheel 102R. In each fluid cylinder 103, a hydraulic chamber 103c is formed by a piston 103b fitted in a cylinder body 103a. The upper end of a rod 103d connected to the piston 103b is connected to the body 101. The cylinder body 103a is connected to each of the wheels 102F and 102R.

A gas spring 105 communicates with the hydraulic chamber 103c of the fluid cylinder 103 through a communicating passage 104. The gas spring 105 has a gas chamber 105f and a hydraulic chamber 105g. The gas chamber 105f is divided by a diaphragm 105e. The hydraulic chamber 105g communicates with the hydraulic chamber 103c of the fluid cylinder 103.

The reference numeral 108 denotes a hydraulic pump. The reference numeral 109 denotes a proportional flow control valve connected to the hydraulic pump 108 through a hydraulic passage 110. The proportional flow control valve 109 has a function of feeding and discharging a fluid to and from the hydraulic chamber 103c of the fluid cylinder 103 so as to adjust the flow of the hydraulic chamber 103c.

The reference numeral 112 denotes a discharge pressure gauge for detecting the oil discharge pressure of the hydraulic pump 108. The reference numeral 113 denotes a hydraulic sensor for detecting the hydraulic pressure of the hydraulic chamber 103c of the fluid cylinder 103. The reference numeral 114 denotes a level sensor for detecting the level (cylinder stroke amount) of each of the wheels 102F and 102R. The reference numeral 115 denotes a vertical acceleration sensor for detecting the vertical acceleration (vertical acceleration on a spring of each of the wheels 102F and 102R) of a vehicle. Three vertical acceleration sensors are provided, one of which is provided in the central portion between the left and right rear wheels 102R in the lateral direction of the vehicle, and others are provided above the left and right front wheels 102F on the almost horizontal surface of the vehicle. Detection signals generated by the gauge and sensors are inputted to an ACS control unit 119 for the variable control of a suspension characteristic having a CPU and the like therein so as to be utilized for the variable control of the suspension characteristic.

In the hydraulic circuit of the ACS device shown in FIG. 7, the hydraulic pump 108 is connected, in pairs, to a hydraulic pump 121 for a power steering device which is driven by a driving source 120. An accumulator 122 communicates with a discharge pipe 108a of the hydraulic pump 108. The discharge pipe 108a branches out into a front wheel side passage 110F and a rear wheel side passage 110R on the downstream side of the accumulator 122. The front wheel side passage 110F branches out into a left wheel side passage 110FL and a right wheel side passage 110FR. The hydraulic chambers 103c of fluid cylinders 103FL and 103FR of corresponding wheels communicate with the passages 110FL and 110FR, respectively. Similarly, the rear wheel side passage 110R branches out into a left wheel side passage 110RL and a right wheel side passage 110RR. The hydraulic chambers 103c of fluid cylinders 103RL and 103RR of corresponding wheels communicate with the passages 110RL and 110RR, respectively.

Each of gas springs 105FL to 105RR which communicate with the fluid cylinders 103FL to 103RR has a plurality of (four) gas springs, respectively. First to fourth gas springs 105a to 105d are connected in parallel through branch communicating passages 104a to 104d relative to a common communicating passage 104. The common communicating passage 104 communicates with the hydraulic chamber 103c of the fluid cylinder 103. The gas springs 105a to 105d for each wheel have orifices 125a to 125d provided on the branch communicating passages 104a to 104d, and basically function as suspension devices by damping action thereof and buffer action of gas charged in the gas chamber 105f.

Each of the gas springs 105FL to 105RR has a damping force switching valve 126 provided on a communicating passage between the first and second gas springs 105a and 105b. The switching valve 126 adjusts the area of the communicating passage and has an opening position in which the communicating passage is opened and a reducing position in which the passage area is reduced. At the time of turning, the switching valve 126 is changed into the reducing position so as to inhibit oil from flowing into and out of the hydraulic chambers 105g of the second and third springs 105b and 105c. Consequently, a necessary amount of oil to be fed and discharged to and from the hydraulic chamber 103c of the hydraulic cylinder 103 at the time of turning is limited to enhance control responsibility.

Similarly, the branch communicating passage 104d is provided with a switching valve 127 having opening and reducing positions. When the switching valve 127 is changed into the opening position, oil is allowed to flow into and out of the hydraulic chamber 105g of the fourth spring 105d so that the suspension characteristic becomes soft. On the other hand, when the switching valve 127 is changed into the reducing position, the oil is inhibited from flowing into and out of the hydraulic chamber 105g of the fourth spring 105d so that the suspension characteristic becomes hard.

An unload relief valve 128 is connected to the discharge pipe 108a of the hydraulic pump 108 in the vicinity of the accumulator 122. The relief valve 128 has opening and closing positions, and has the following function. More specifically, in case an oil discharge pressure measured by the discharge pressure gauge 112 is greater than a high limit preset value, there is performed switching to the opening position so as to return the oil of the hydraulic pump 108 to a reserve tank 129 and hold the oil accumulating value of the accumulator 122 to a preset value. Oil is fed to each fluid cylinder 103 by the oil accumulation of the accumulator 122.

The structures of left and right front wheels and left and right rear wheels are the same. For this reason, only the left front wheel side will be described. More specifically, the left front wheel side passage 110FL has the proportional flow control valve 109 provided thereon. The proportional flow control valve 109 has a stop position in which all ports are closed, a feed position in which the left front wheel side passage 110FL is opened, and a discharge position in which the fluid cylinder 103 side of the left front wheel side passage 110FL communicates with a return pipe 132. In addition, the proportional flow control valve 109 has a pressure compensating valve 109a therein. The hydraulic pressure of the hydraulic chamber 103c of the fluid cylinder 103 is held to a predetermined value by the pressure compensating valve 109a in the feed and discharge positions.

On the fluid cylinder 103 side of the proportional flow control valve 109 is provided a switching valve of a pilot pressure reaction type 133 for opening and closing the left front wheel side passage 110FL. The switching valve 133 has the following function. More specifically, when opening an electromagnetic valve 134 for guiding the hydraulic pressure of the left front wheel side passage 110FL on the hydraulic pump 108 side of the proportional flow control valve 109, the same hydraulic pressure is introduced as a pilot pressure. When the pilot pressure is greater than a predetermined value, opening operation is performed to open the left front wheel side passage 110FL so that flow to the fluid cylinder 103 can be controlled by the proportional flow control valve 109. In addition, when closing the switching valve 133, the front wheel side passage 110FL is sealingly closed so that the oil of the hydraulic chamber 103c of the hydraulic cylinder 103 can surely be prevented from leaking out.

In FIG. 7, the reference numeral 135 denotes a relief valve. When the hydraulic pressure of the hydraulic chamber 103c of the fluid cylinder 103 is abnormally increased, the relief valve 135 is opened to return oil to the return pipe 132. The reference numeral 136 denotes an ignition key interlocking valve connected in the vicinity of the accumulator 122 of the discharge pipe 108a of the hydraulic pump 108. After ignition-off, the ignition key interlocking valve 136 is opened to return oil accumulated in the accumulator 122 to the reserve tank 129 so that a high-pressure state is removed. The reference numeral 137 denotes an in-pump relief valve. When the oil discharge pressure of the hydraulic pump 108 is abnormally increased, the in-pump relief valve 137 returns oil to the reserve tank 129 so as to reduce the oil discharge pressure. The reference numeral 138 denotes a return accumulator connected to the return pipe 132 for taking accumulating action when oil is discharged from the fluid cylinder 103.

With reference to FIGS. 8 to 11, there will be described the variable control of a suspension characteristic, that is, the flow control of the fluid cylinder 103 performed by the ACS control unit 119.

Figure 8:
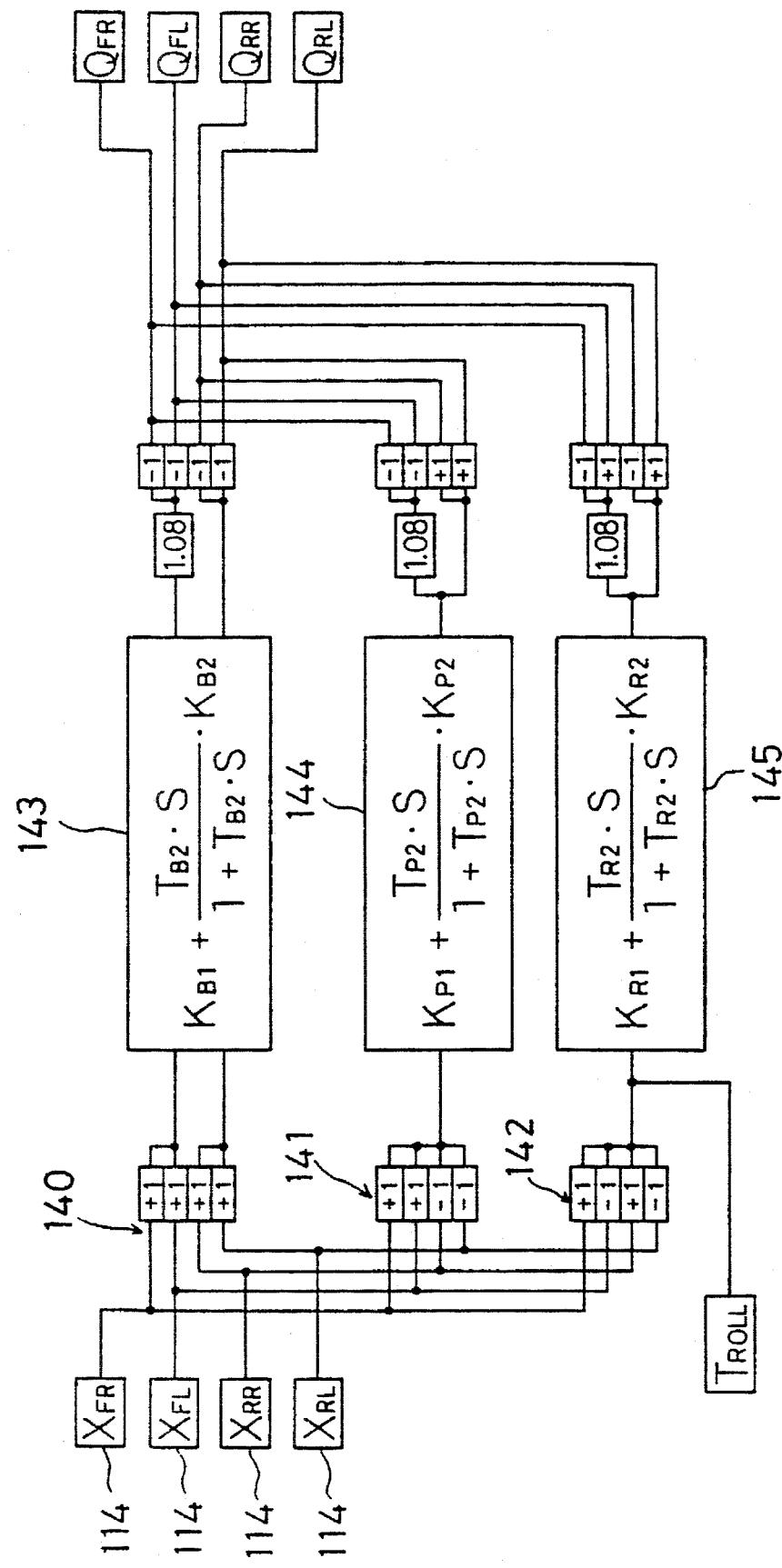
Figure 9:
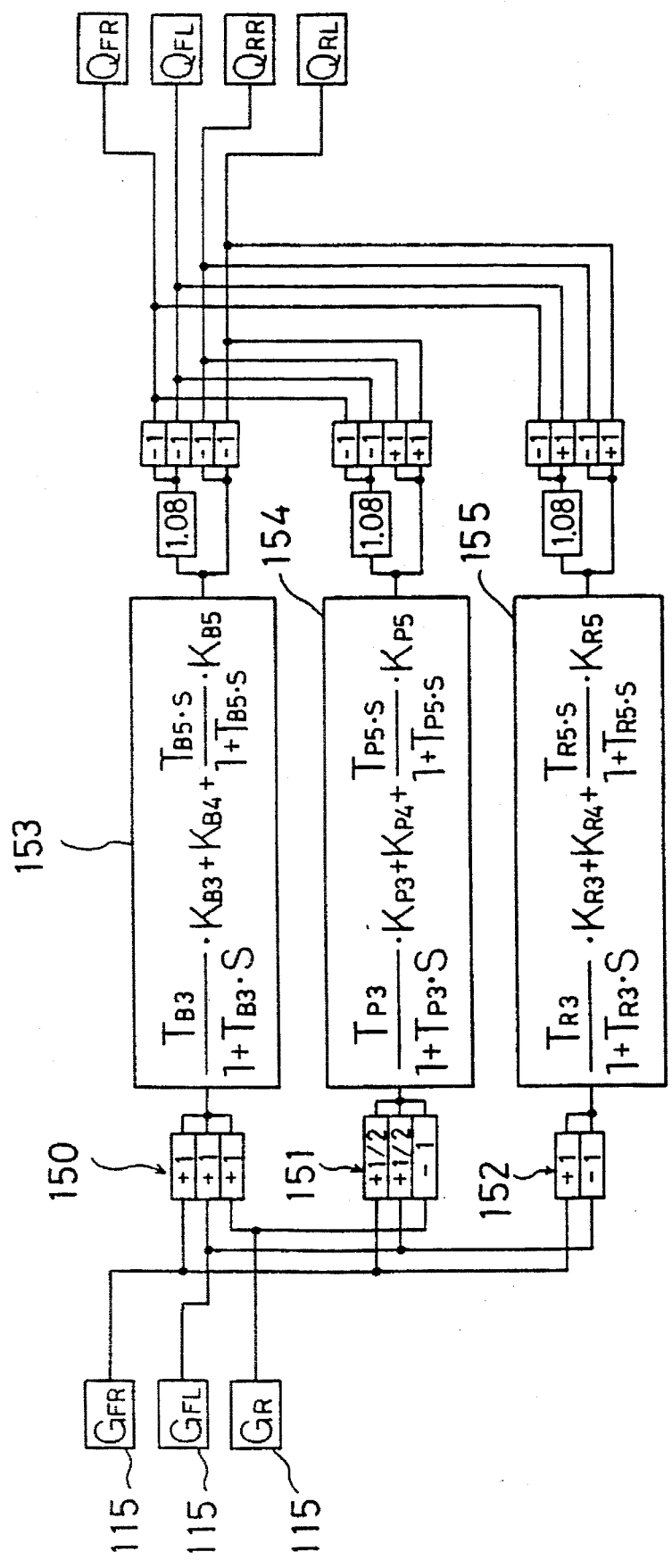
Figure 10:
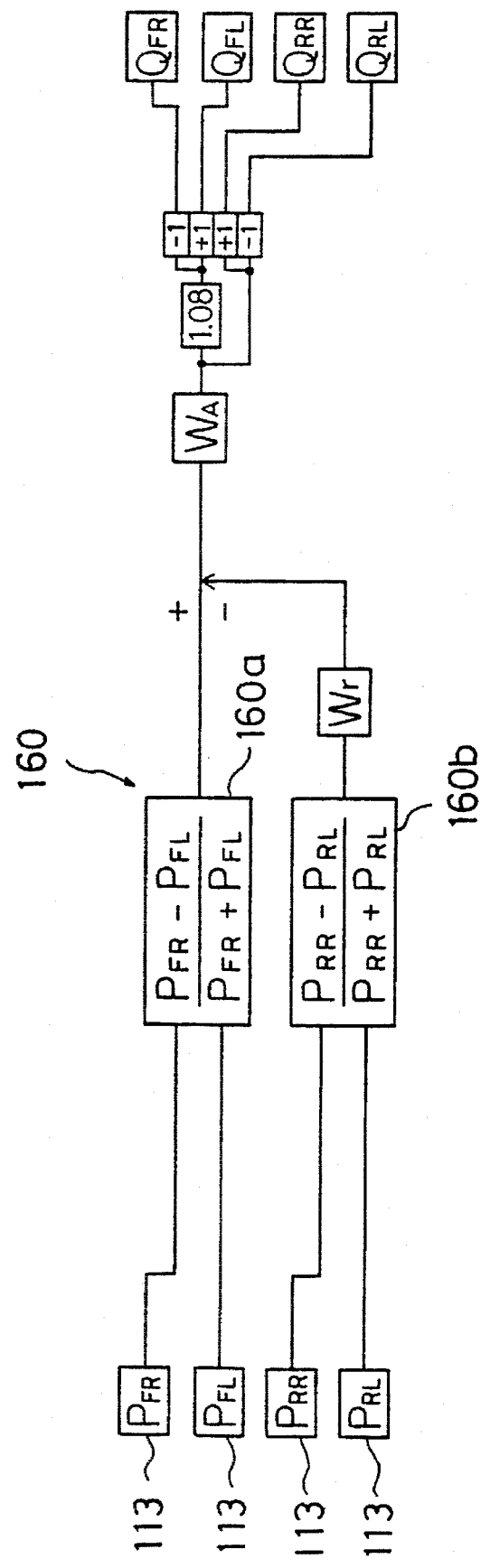
Figure 11:
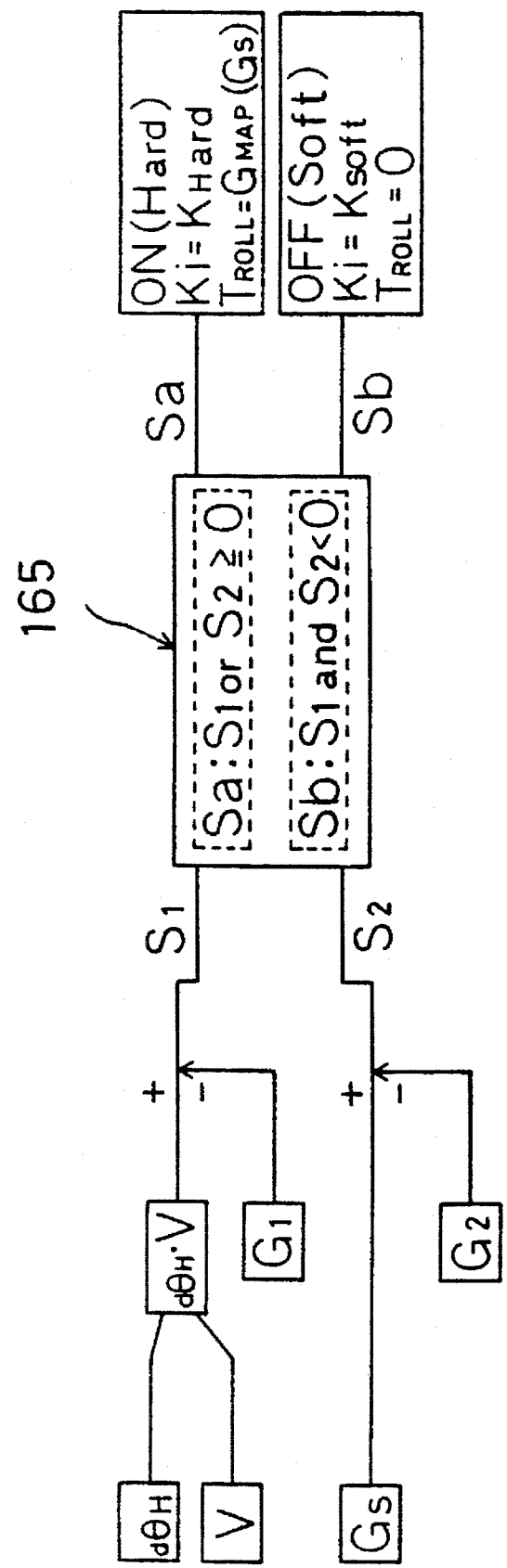

FIG. 8 shows a control system for controlling a level to a desired one (a cylinder stroke amount to a desired one) based on the detection signal of the level sensor 114 for each wheel. FIG. 9 shows a control system for reducing the vertical vibration of a vehicle based on the detection signals of three vertical acceleration sensors 115. FIG. 10 shows a control system for making supporting loads between left and right wheels uniform on the front and rear wheel sides based on the detection signal of the hydraulic sensor 113 for each wheel. FIG. 11 shows a control system for increasing the flow control responsibility of the fluid cylinder 103 at the time of turning.

In FIG. 8, the reference numeral 140 denotes a bounce component calculating part for adding outputs XFR and XFL of the level sensors 114 on the left and right front wheel 102F sides, and adding outputs XRR and XRL of the level sensors 114 on the left and right rear wheel 102R sides so as to calculate the bounce component of a vehicle. The reference numeral 141 denotes a pitch component calculating part for subtracting a value obtained by adding the outputs XRR and XRL from a value obtained by adding the outputs XFR and XFL so as to calculate the pitch component of the vehicle. The reference numeral 142 denotes a roll component calculating part for adding a difference between the outputs XFR and XFL and a difference between the outputs XRR and XRL so as to calculate the roll component of the vehicle.

The reference numeral 143 denotes a bounce control part for inputting the bounce component of the vehicle which is calculated by the bounce component calculating part 140 and for calculating the bounce control amount for the proportional flow control valve 109 for each wheel based on the following PD control (proportional - differential control) formula.

$$KB1 + \{TB2 \cdot S/(1+TB2\ S)\} \cdot KB2$$

The reference numeral 144 denotes a pitch control part for inputting the pitch component of the vehicle which is calculated by the pitch component calculating part 141 and for calculating a pitch control amount for the proportional flow control valve 109 based on the PD control formula. The reference numeral 145 denotes a roll control part for inputting the roll component of the vehicle calculated by the roll component calculating part 142 and a desired roll angle TROLL of the vehicle to be described below, and for calculating a roll control amount for the proportional flow control valve 109 so that a level is slanted by the desired roll angle TROLL based on the PD control formula.

In order to control the level to a desired one, the control amount calculated by each of the control parts 143 to 145 is inverted for each wheel (in the direction opposite to the positive or negative direction of signal input of the level sensor 114). Then, the bounce, pitch and roll control amounts for each wheel are added to obtain control amounts QFR, QFL, QRR and QRL of the proportional flow control valves 109 corresponding to the wheels.

In FIG. 9, the reference numeral 150 denotes a bounce component calculating part for adding outputs GFR, GFL and GR of three vertical acceleration sensors 115 so as to calculate the bounce component of the vehicle. The reference numeral 151 denotes a pitch component calculating part for subtracting the output GR of the level sensor 115 on the rear wheel 102R side from the half of a value obtained by adding the outputs GFR and GFL of the level sensors 115 on the left and right front wheel 102F sides so as to calculate the pitch component of the vehicle. The reference numeral 152 denotes a roll component calculating part for subtracting the output GFL of the level sensor 115 on the left front wheel 102F side from the output GFR of the level sensor 115 on the right front wheel 102F side so as to calculate the roll component of the vehicle.

The reference numeral 153 denotes a bounce control part for inputting the bounce component of the vehicle which is calculated by the bounce component calculating part 150 and for calculating a bounce control amount for the proportional flow control valve 109 for each wheel based on the following IPD control (integral - proportional - differential control) formula.

$$\{TB3/(1+TB3\ S)\}KB3 + KB4 + \{TB5\ S/(1+TB5\ S)\}KS5$$

The reference numeral 154 denotes a pitch control part for inputting the pitch component of the vehicle which is calculated by the pitch component calculating part 151 and for calculating a pitch control amount for the proportional flow control valve 109 based on the IPD control formula. The reference numeral 155 denotes a roll control part for inputting the roll component of the vehicle which is calculated by the roll component calculating part 152, and for calculating a roll control amount for the proportional flow control valve 109 based on the IPD control formula.

In order to control the vertical vibration of the vehicle by the bounce, pitch and roll components, the control amount calculated by each of the control parts 153 to 155 is inverted for each wheel as described above. Then, the bounce, pitch and roll control amounts for each wheel are added to obtain control amounts QFR, QFL, QRR and QRL of the proportional flow control valves 109 corresponding to the wheels. Referring to the control amount for each wheel calculated by each of the control parts 153 to 155, the control amount on the front wheel side is corrected by a weighting coefficient k (k=1.08) so as to have a great value because loads shared by the front and rear wheels are different from each other.

In FIG. 10, the reference numeral 160 denotes a warp control part. The warp control part 160 includes load moving ratio calculating parts 160a and 160b on the front and rear wheel sides. The load moving ratio calculating part 160a inputs the signals of hydraulic pressures PFR and PFL of two hydraulic sensors 113 on the front wheel side, and calculates the ratio (load moving ratio) of a hydraulic pressure difference (PFR - PFL) of the left and right wheels to a total hydraulic pressure on the front wheel side. Similarly, the load moving ratio calculating part 160b calculates a load moving ratio on the rear wheel side. The load moving ratio on the rear wheel side is multiplied by a coefficient Wr. Then, a value thus obtained is subtracted from the load moving ratio on the front wheel side. The result of subtraction is multiplied by a coefficient Wa and weighted on the front wheel side. Thereafter, a control amount for each wheel is inverted to be made uniform between the left and right wheels so that there are obtained control amounts QFR, QFL, QRR and QRL of the proportional flow control valves 109 corresponding to the wheels.

In the control system shown in FIG. 11, a steering angle speed dθH and a speed V are multiplied together so as to obtain a value dθH·V. To a turning deciding part 165 is inputted a value S1 which is obtained by subtracting a reference value G1 from the value dθH·V. To the turning deciding part 165 is inputted a value S2 which is obtained by subtracting a reference value G2 from a lateral acceleration Gs of the vehicle at the present time. When the input S1 or S2 is equal to or greater than 0, the turning deciding part 165 decides that the vehicle is turning to output a hard signal Sa of the suspension characteristic. Consequently, the damping force switching valve 126 is changed into a reducing position in order to enhance the follow-up of flow control for the fluid cylinder 103. In addition, each of proportional constants Ki (i=B1 to B5, P1 to P5, R1 to R5) is set to a great value KHard and to a value corresponding to a lateral acceleration Gs at that time according to a map Gmap (Gs) prestoring the desired roll angle TROLL (in which TROLL is made greater when the lateral acceleration Gs is increased, TROLL is equal to 0 when the lateral acceleration is Gs1, TROLL is negative when the lateral acceleration is smaller than Gs1, and TROLL is positive when the lateral acceleration is greater than Gs1).

When the inputs S1 and S2 are smaller than 0, the turning deciding part 165 decides that the vehicle runs straight to output a soft signal Sb of the suspension characteristic and to change the damping force switching valve 126 into the opening position. In addition, the proportional constant Ki is set to a normal value KSoft and the desired roll angle TROLL is set to 0.

Figure 12:
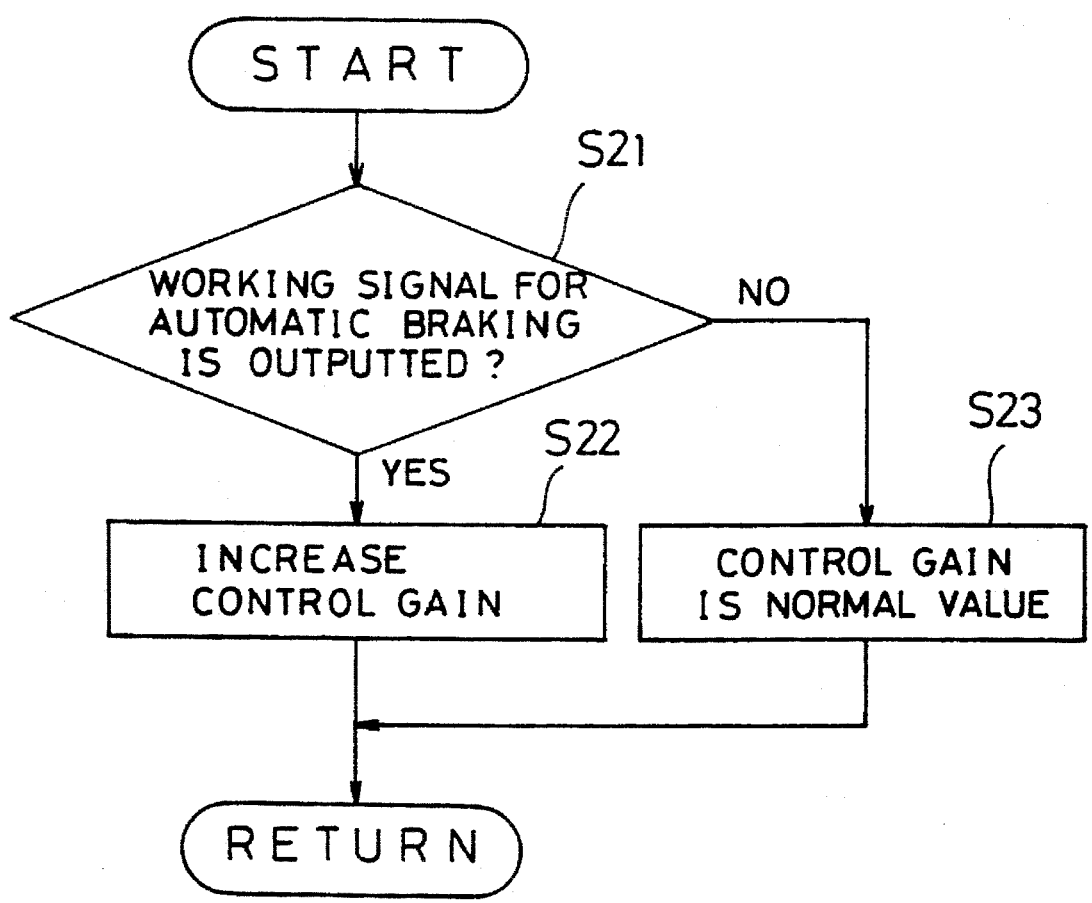

As shown in FIG. 6, the present invention is characterized in that a working signal outputted from the control unit 45 as the control part of the automatic braking device when performing automatic braking is inputted to the ACS control unit 119 as the control part of the active suspension device so that the suspension characteristic is changed and controlled by the ACS control unit 119. The control of the ACS control unit 119 is performed based on the working signal according to control flow shown in FIG. 12.

At Step S21, it is first decided whether a working signal for automatic braking is outputted from the ACS control unit 119. If decision is YES, a control gain is increased at Step S22. Then, this routine returns. If decision is NO, the control gain is set to a normal value at Step S23. Then, this routine returns.

According to the first embodiment, when automatic braking is applied to the vehicle by the operation of the automatic braking device, the working signal is outputted from the control unit 45 of the automatic braking device to the actuator 16 and the ACS control unit 119. In the ACS control unit 119, the control gain is increased, and ACS operation is earlier started. Consequently, slip and spin can effectively be prevented from being caused by automatic braking so that running stability can be enhanced.

Figure 13:
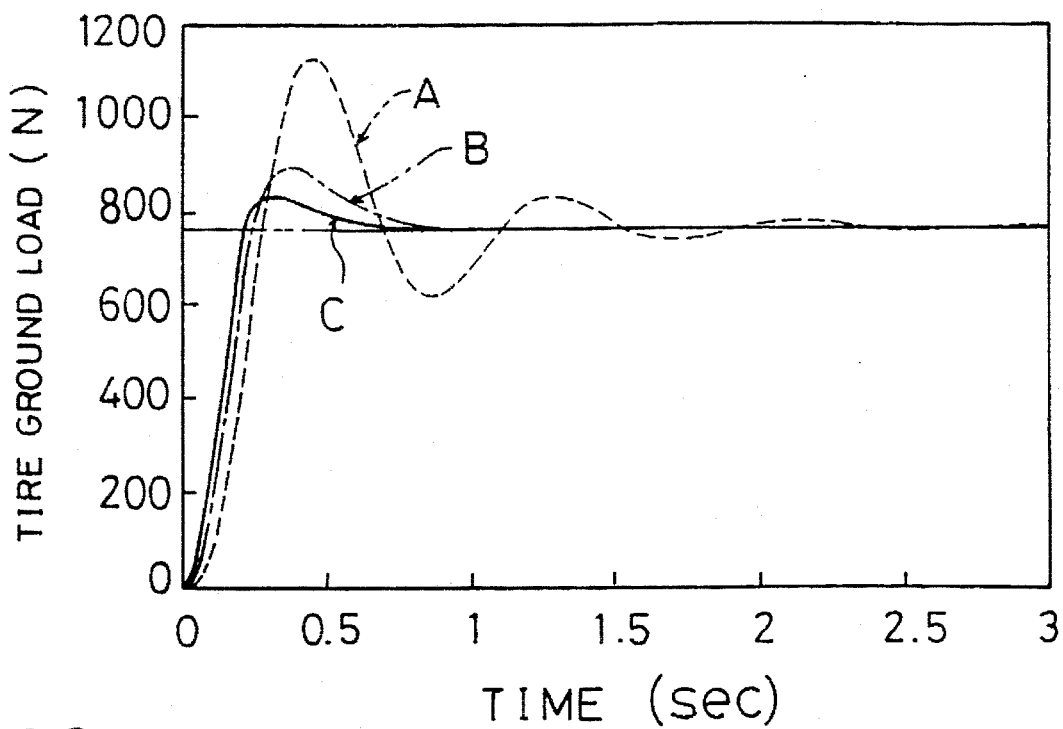
Figure 14:
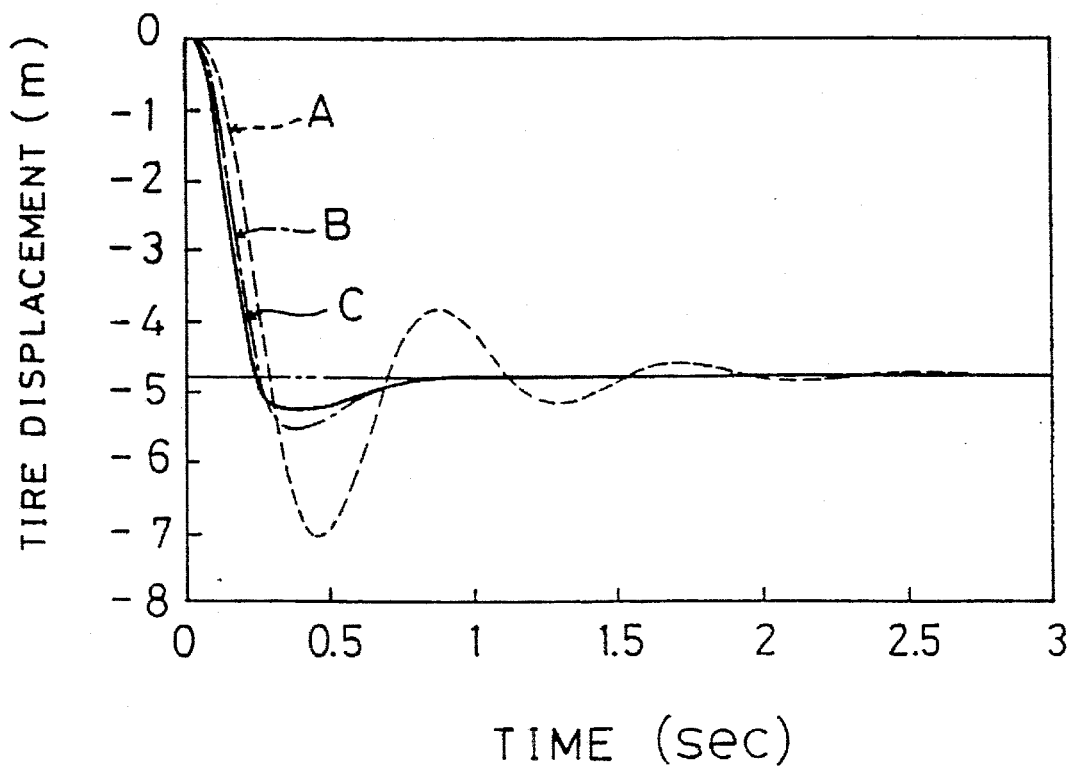

FIGS. 13 and 14 show the results of simulation at the time of braking which is executed for the wheels according to the first and second prior art and the present embodiment. A vehicle according to the first prior art is provided with a suspension device of a passive type, of which simulation results are shown by a broken line A. A vehicle according to the second prior art is provided with an ACS device for detecting the behavior of the vehicle by means of a sensor at the time of braking so as to control the operation thereof, of which simulation results are shown by a virtual line B. The simulation results of the present embodiment are shown by a solid line C. According to the present embodiment, a tire ground load and a tire displacement rise faster and an amount of overshoot is smaller than in the second prior art. Consequently, convergence on a desired value can rapidly be carried out.

Figure 15:
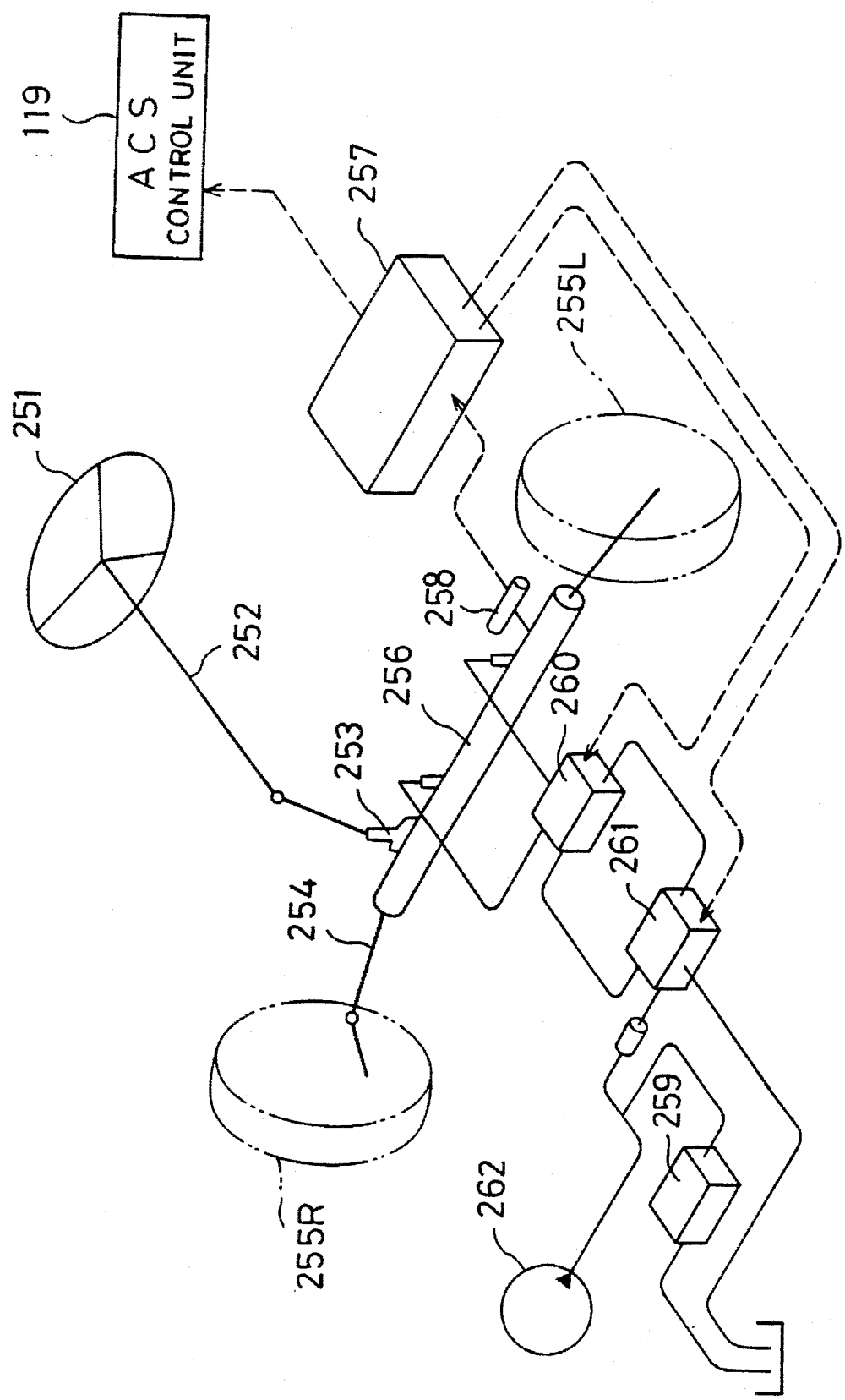
FIGS. 15 to 21 show a second embodiment.

FIG. 15 shows an automatic steering device as a contact preventive device forming one of components of an integrated controller for a vehicle according to a second embodiment of the present invention. In the second embodiment, the integrated controller for a vehicle is provided with an automatic braking device and an ACS device. The structure of the ACS device is the same as in the first embodiment shown in FIGS. 6 and 7.

In FIG. 15, the reference numeral 251 denotes a steering wheel, and the reference numeral 252 denotes a steering shaft. The steering shaft 252 has its upper end connected to the steering wheel 251 and its lower end connected to left and right (front) wheels 255L and 255R through a rack and pinion mechanism 253 and a rod 254 which extends in the direction of a car width, and the like. The left and right (front) wheels 255L and 255R are steered by the steering wheel 251. The rod 254 is provided with an automatic steering cylinder 256 so that automatic steering can be performed. A control unit 257 receives the output of a position sensor 258 for detecting the position of the rod 254, controls a switching valve 260 and an automatic steering valve 261, and feeds pressure oil from a hydraulic pump 262 to the automatic steering cylinder 256 so as to perform automatic steering by feedback control. In FIG. 15, the reference numeral 259 denotes a relief valve.

In consideration of a road friction coefficient and the motion characteristic of vehicles depending on running conditions for vehicles (a distance between vehicles, a distance between a forward vehicle and a guide rail, and the like), there is set a steering pattern for contact prevention so that automatic steering is performed if necessary. After automatic steering is completed, there is performed corrective steering for compensating for motion having errors which is caused by the deviation of actual vehicle characteristics from vehicle characteristics used for setting the steering pattern. Consequently, the vehicle is stabilized.

There will be described the control of automatic steering performed by the control unit 257 so as to prevent the vehicle from coming in contact with the forward vehicle.

Figure 16:
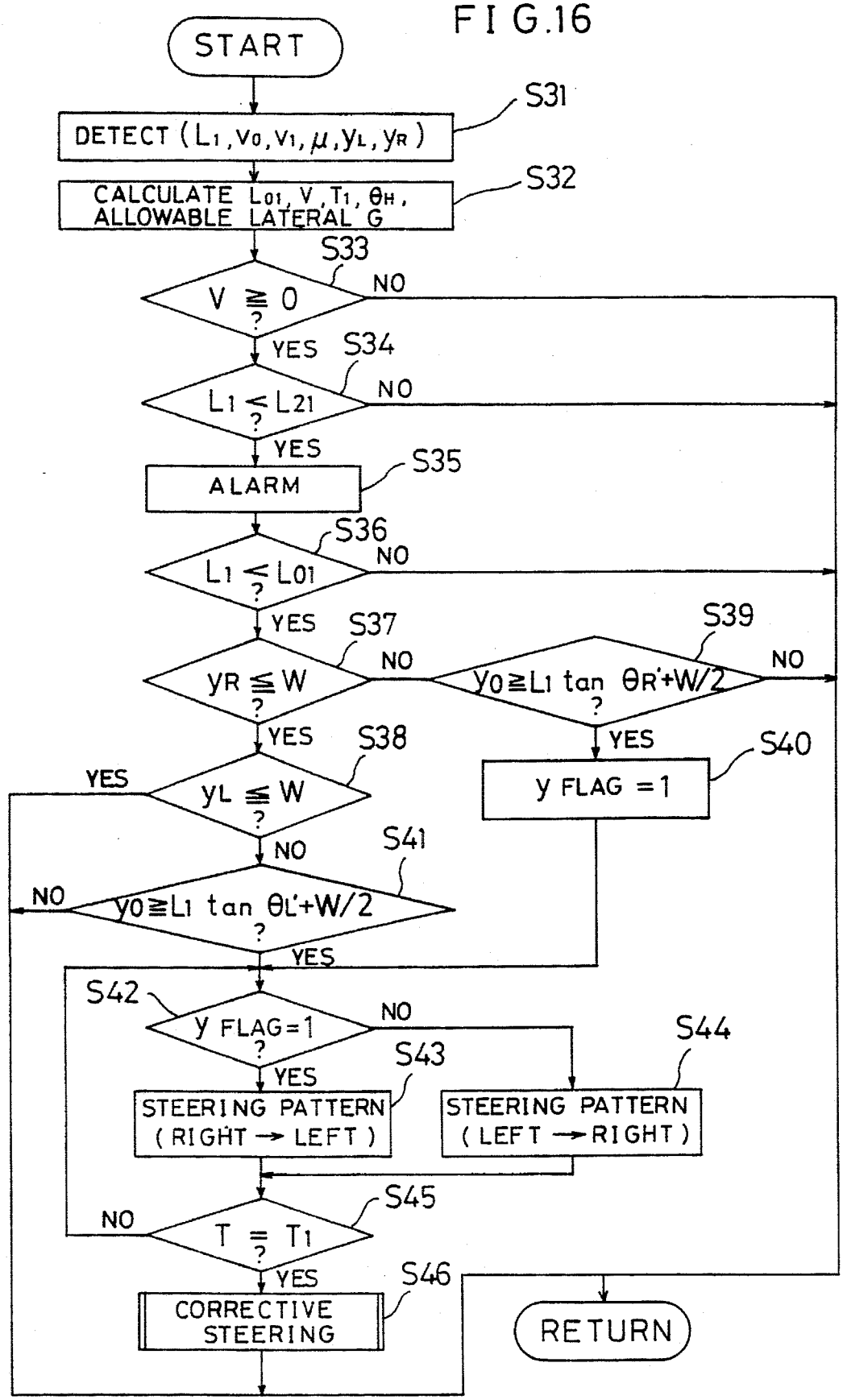
Figure 17:
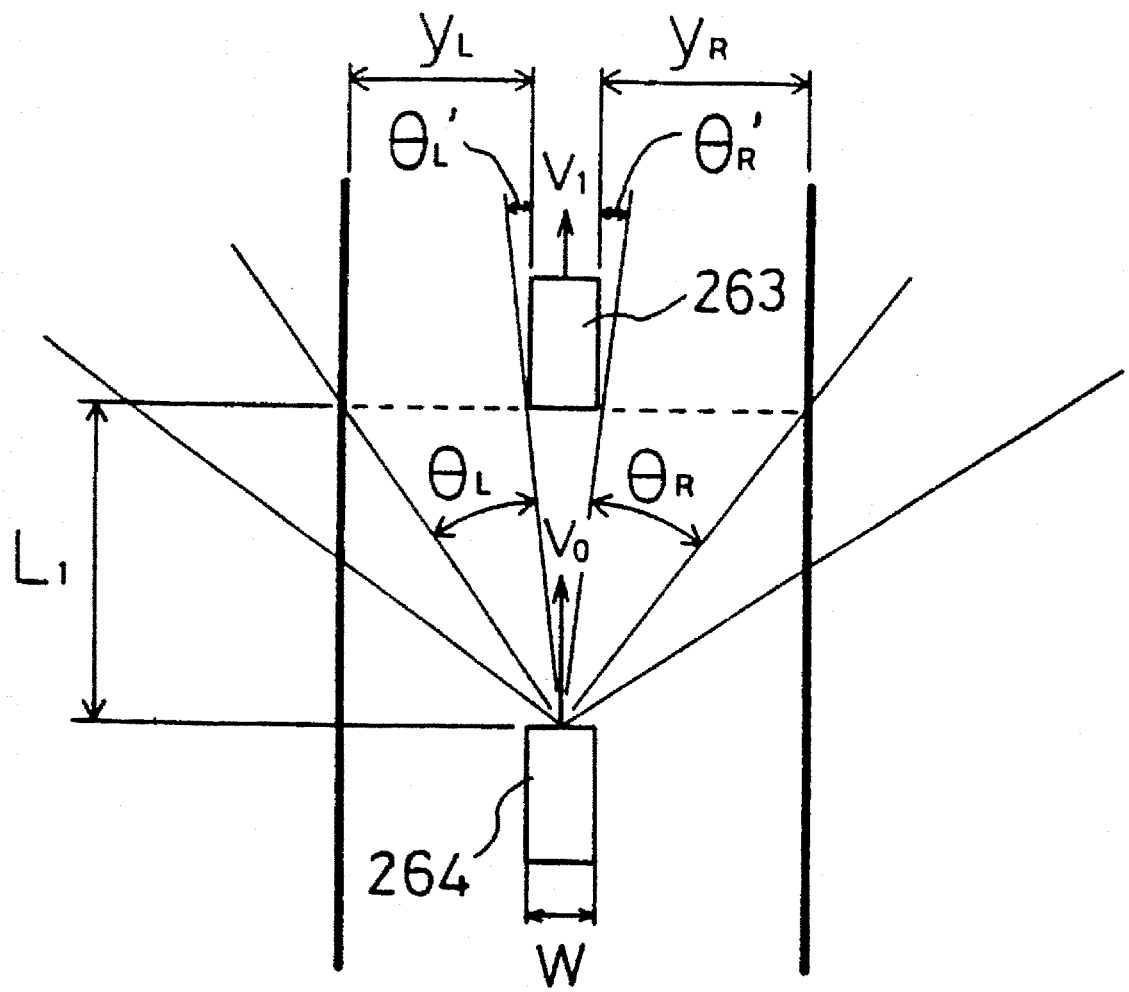

In FIG. 16, there are first detected, at Step S31, a distance L1 between a forward vehicle and a vehicle, a speed v0 of the vehicle, a speed v1 of the forward vehicle, a road friction coefficient μ, a left allowance yL and a right allowance yR. The distance L1, speeds v0 and v1, and road friction coefficient μ are detected by the distance and relative speed detecting means 36, speed sensor 42 and road μ sensor 44 shown in FIG. 3 according to the first embodiment. By an external environment recognition system such as the distance and relative speed detecting means 36, there are detected the distance L1 between a forward vehicle 263 and a vehicle 264, and angles θR and θL of the forward vehicle with boundary lines of street such as guide rails or white lines on both sides (see FIG. 17). For example, the right and left allowances yR and yL are found by the following formulas.

$$yR = L1 \cdot \tan\theta R$$

$$yL = L1 \cdot \tan\theta L$$

The white line can be detected by virtue of reflection by a cat's eye provided thereon or the like and the application of an image processing technique using a video camera or the like.

At Step S32, there are calculated, based on detected values, a minimum distance L01 between vehicles necessary for passing, a relative speed V (=v0−v1) of a vehicle to a forward vehicle, a passing time T1, a steering angle θH and an allowable lateral G.

The minimum distance L01 between vehicles is calculated by the following formula.

$$L01=(v0-v1)\cdot T1$$

The time T1 necessary for steering is determined by the following formula depending on a lateral moving distance y0 and an allowable maximum lateral G. The allowable maximum lateral G is determined by the road friction coefficient.

$$T1 = \sqrt{2\pi \cdot \frac{y0}{\ddot{y}0}}$$

In consideration of a model of a vehicle, the steering angle θH is determined by the following formula.

$$\frac{\dot{y}0}{\theta H} = \frac{1}{1+AV0^2} \cdot \frac{V0^2}{l} \cdot \frac{\omega n^2}{N} \cdot \frac{\sqrt{\left(1-\frac{I\omega^2}{2lKr}\right)^2 + \left(\frac{lr}{V0}\omega\right)^2}}{\sqrt{(\omega n^2-\omega^2)^2 + 4\zeta^2\omega n^2\omega^2}}$$

where A is a stability factor, V0 is a speed of a vehicle, l is a wheel base, N is a steering gear ratio, ωn is a natural frequency. I is yaw moment of inertia, Kr is rear cornering power, ζ is a damping ratio, ω is an input frequency (=2π/T1), and $l_r$ is a longitudinal distance between a center of gravity of a vehicle and a rear axle.

Figure 18:
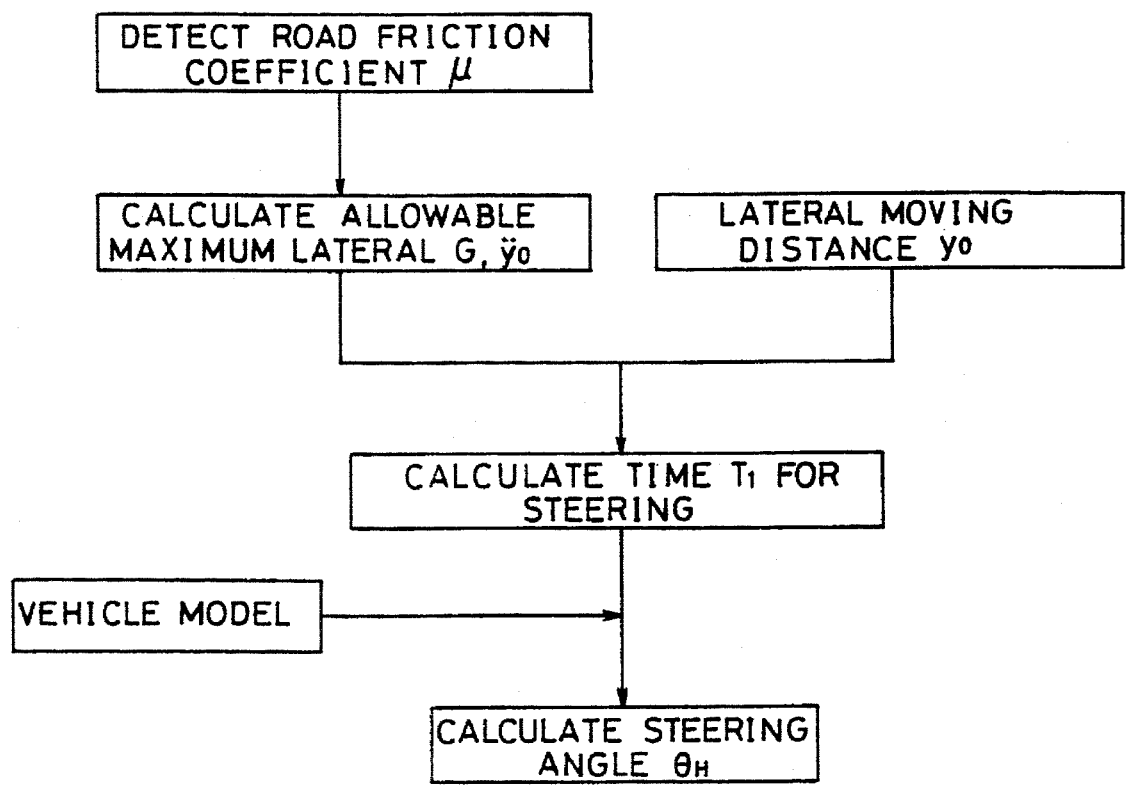

Also in consideration of the road friction coefficient detected by a known method, the steering angle is determined (see FIG. 18). More specifically, when the road friction coefficient μ is smaller, the allowable lateral G is decreased.

Figure 19:
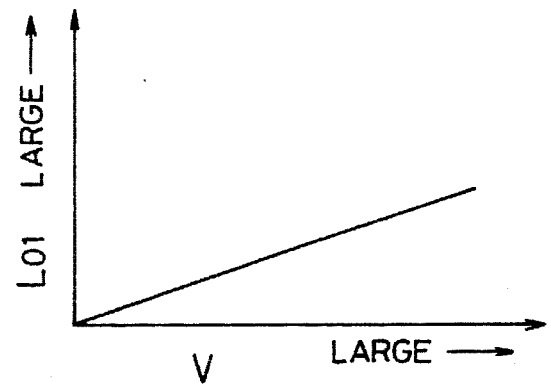

The necessary lateral moving distance is almost constant. Consequently, when the allowable lateral G is decreased, the time necessary for steering is increased. Consequently, the steering angle is made smaller. As shown in FIG. 19, when the relative speed V is increased, the minimum distance L01 (=V T1) necessary for automatic steering is made greater.

Figure 20:
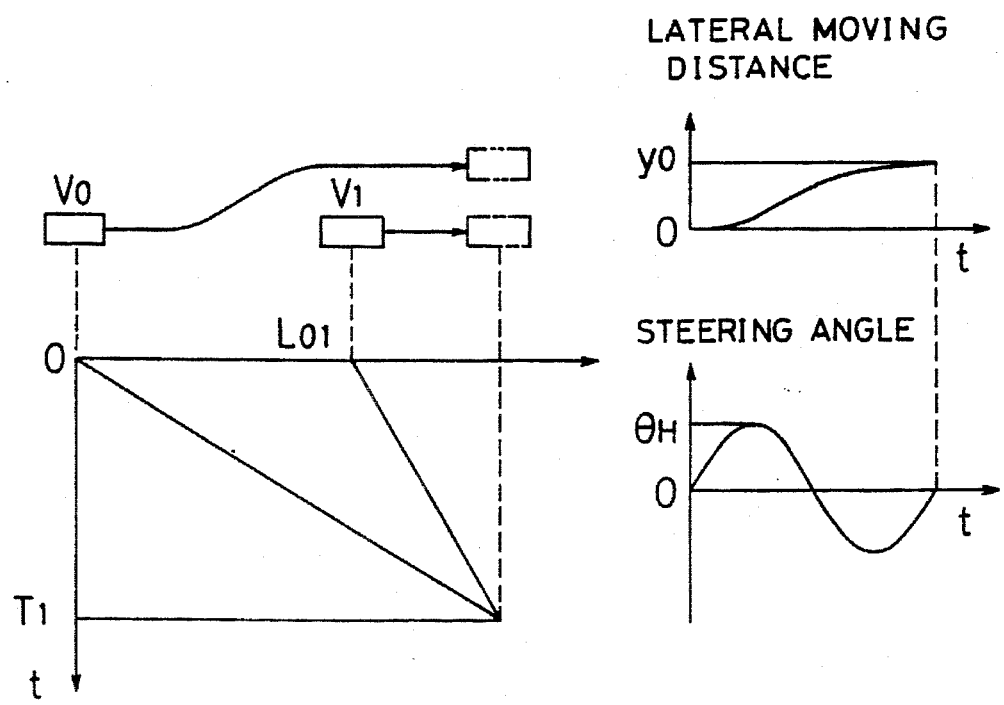

Based on the foregoing, an automatic steering pattern is determined as shown in FIG. 20. More specifically, automatic steering is performed with a sine single wave-shaped pattern so that the vehicle can laterally move by a predetermined amount y0 until it catches up with the forward vehicle.

Subsequently to the above-mentioned calculation, it is decided whether the relative speed V is equal to or greater than 0, that is, the vehicle and the forward vehicle are approaching each other at Step S33 in order to check whether there is a possibility of contact. If the relative speed V is equal to or greater than 0, there is the possibility of contact. Consequently, it is decided whether the distance L1 between vehicles is smaller than an alarm distance L21 at Step S34. If the distance L1 is smaller than the alarm distance L21, an alarm (for example, an alarm lamp or alarm buzzer) is raised at Step S35. If the distance L1 is not smaller than the alarm distance L21, this routine returns.

After the alarm is raised, it is decided whether the distance L1 is smaller than the minimum distance L01 at Step S86. If the distance L1 is smaller than the minimum distance L01, it is necessary to prevent contact. Consequently, it is decided whether the right allowance yR is equal to or smaller than a width W of the vehicle 264 at Step S37 in order to decide whether the vehicle 264 can afford to enter the right space of the forward vehicle 263 (see FIG. 17). If the right allowance yR is equal to or smaller than the width W of the vehicle 264, the vehicle 264 cannot move right. Consequently, it is decided whether the left allowance yL is equal to or smaller than the width W of the vehicle 264 at Step S38. If the left allowance yL is equal to or smaller than the width W of the vehicle 264, the vehicle 264 cannot move left. Consequently, this routine returns.

At Step S37, if the right allowance yR is greater than the width W of the vehicle 264, there is a possibility that the vehicle 264 can move right. Consequently, it is decided whether the lateral moving amount y0 of the vehicle 264 is equal to or greater than a length of L1 tan θR'+W/2 at Step S39 in order to decide whether the vehicle 264 can run abreast of the forward vehicle 263. If the lateral moving amount y0 is equal to or greater than the length of L1 tan θR'+W/2, a y-flag is equal to 1 at Step S40. Then, this routine proceeds to Step S42. If the lateral moving amount y0 is smaller than the length of L1 tan θR'+W/2, this routine returns. At Step S38, if the left allowance yL is greater than the width W of the vehicle 264, there is a possibility that the vehicle 264 can move left. Consequently, it is decided whether the lateral moving amount y0 is equal to or greater than a length of L1 tan θL'+W/2 at Step S41 in order to decide whether the vehicle 264 can run abreast of the forward vehicle 263. If the lateral moving amount y0 is equal to or greater than the length of L1 tan θL'+W/2, this routine proceeds to Step S42. If the lateral moving amount y0 is smaller than the length of L1 tan θL'+W/2, this routine returns.

At Step S42, it is decided whether the y-flag is equal to 1. If the y-flag is equal to 1, automatic steering is performed with a pattern which changes from right to left so that contact is prevented at Step S43. If the y-flag is not equal to 1, automatic steering is performed with a pattern which changes from left to right so that contact is prevented at Step S44.

It is then decided whether the passing time T1 has elapsed at Step S45. Until the passing time T1 elapses, automatic steering is continued. After the passing time T1 elapses, corrective steering is performed at Step S46. Then, this routine returns.

Figure 21:
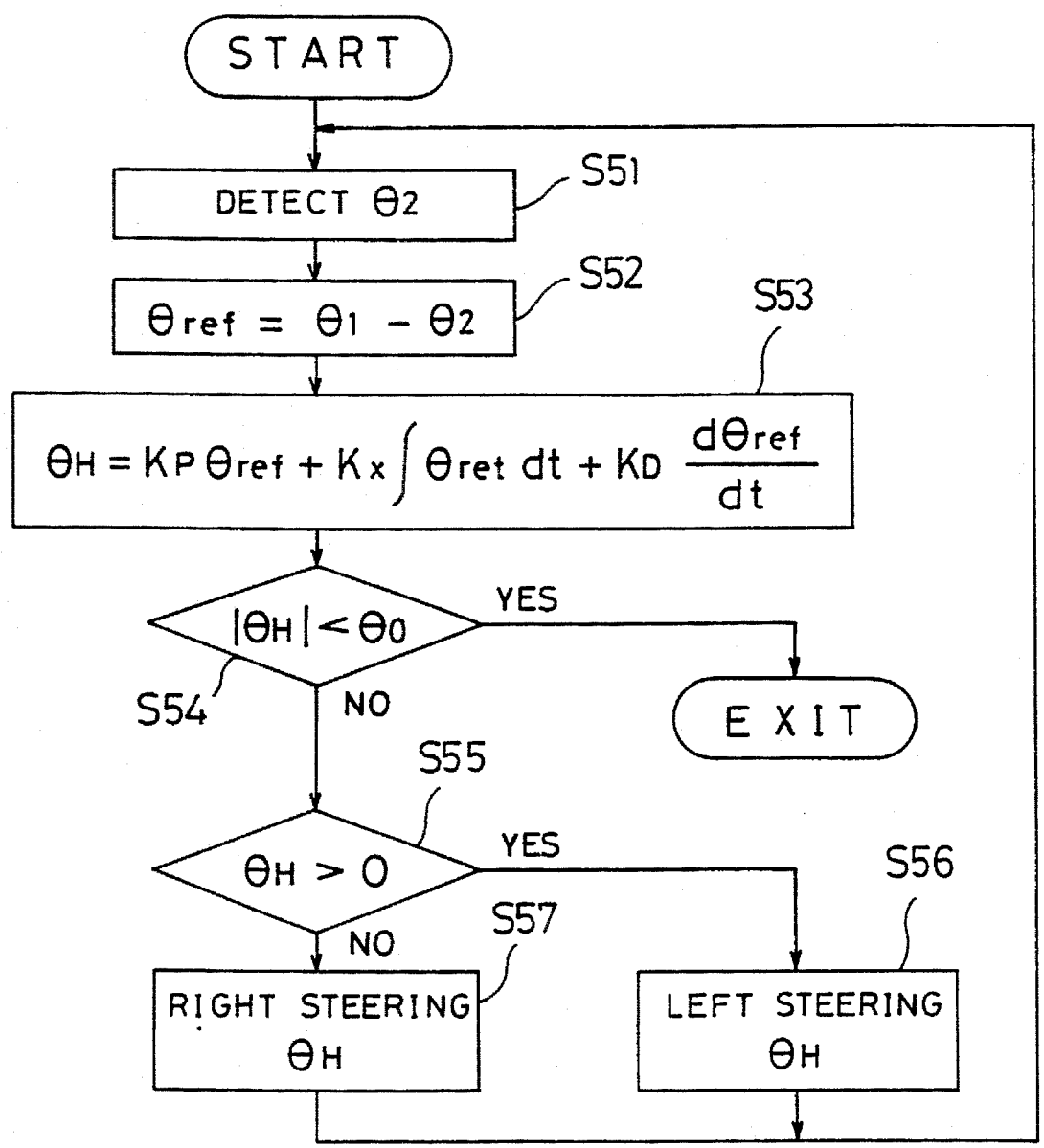

The corrective steering in Step S46 is performed according to a subroutine shown in FIG. 21. First, a yaw angle θ2 after steering start is detected by integrating the output of a yaw rate gyro at Step S51. Then, there is calculated a difference θref between a yaw angle θ1 before steering start and the yaw angle θ2 after steering start at Step S52. Based on the difference θ ref, an automatic steering angle θH is detected at Step S53.

It is decided whether the absolute value of the automatic steering angle θH is smaller than a play θO of the steering angle at Step S54. If the absolute value of the automatic steering angle θH is smaller than the play θO, steering is not needed so that this routine ends. If the absolute value of the automatic steering angle θH is not smaller than the play θO, it is decided whether the automatic steering angle θH is positive at Step S55. If the automatic steering angle θH is positive, steering is performed left by the steering angle θH at Step S56. If the automatic steering angle θH is not positive, steering is performed right by the steering angle θH at Step S57.

Thus, corrective steering is performed. Consequently, there can be eliminated the deviation of advance directions when starting steering and after ending steering.

As shown in FIG. 15, the present invention is characterized in that the control unit 257 as the control part of the automatic steering device outputs a control signal to the switching wave 260 and automatic steering valve 261, and simultaneously outputs a working signal to an ACS control unit 119 as the control part of the active suspension device at the time of automatic steering (Step S43 or S44). The ACS control unit 119 switches a flow adjusting valve 9 for each wheel (see FIGS. 6 and 7) so as to control the rolling of the vehicle caused by automatic steering based on the working signal. Consequently, the suspension characteristic is changed and controlled.

According to the second embodiment, when automatic steering is performed by the operation of the automatic steering device, a control signal is outputted from the control unit 257 of the automatic steering device to the switching valve 260 and automatic steering valve 261. At the same time, a working signal is outputted to the ACS control unit 119. By changing a control gain into a greater value or forecasting the rolling of the vehicle caused by automatic steering in the ACS control unit 119, the suspension characteristic is changed to control the rolling of the vehicle almost simultaneously with automatic steering. Consequently, the rolling of the vehicle is effectively controlled so that running stability can be enhanced.

Figure 22:
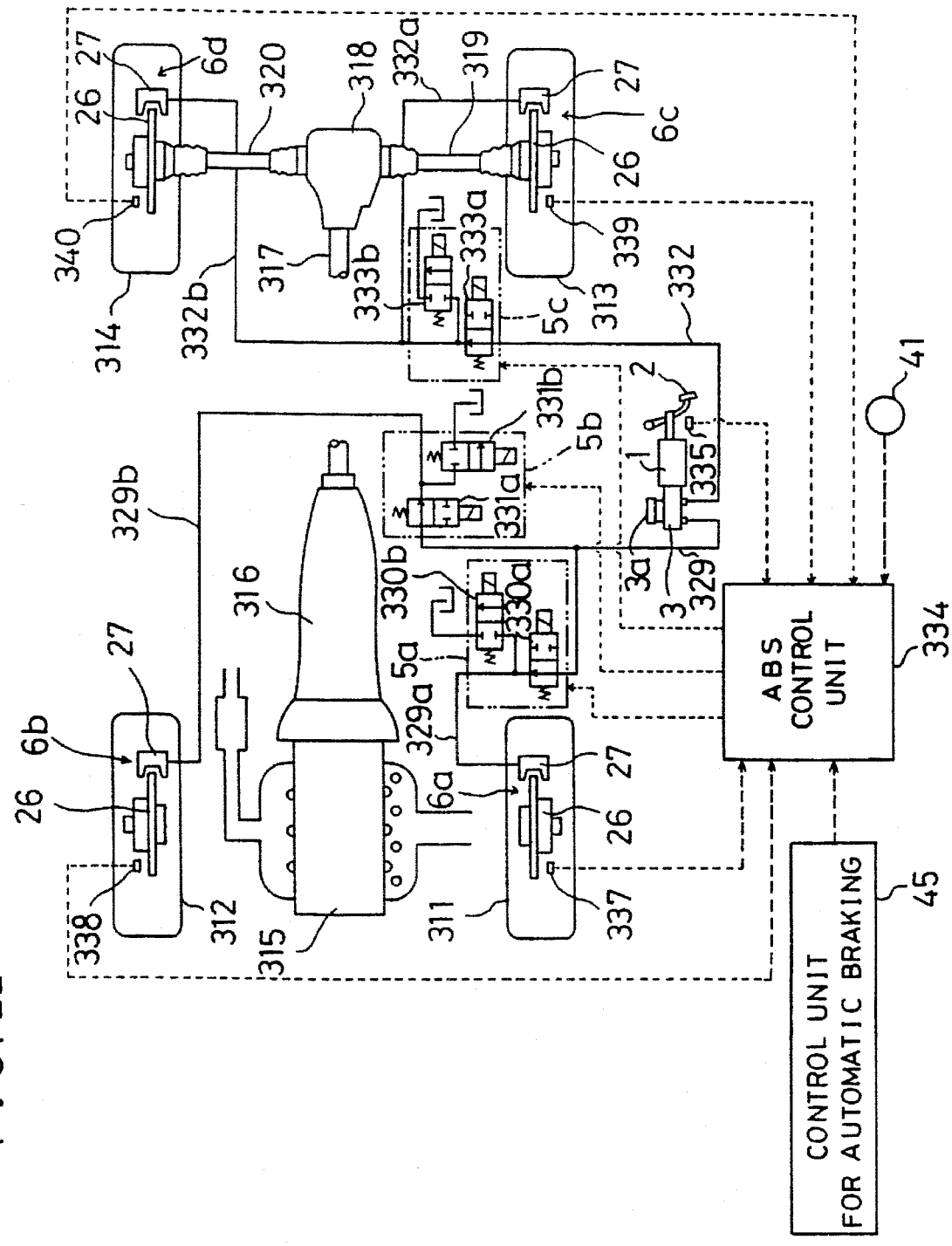
FIGS. 22 to 26 show a third embodiment.

FIG. 22 shows an antiskid braking device forming one of components of an integrated controller for a vehicle according to a third embodiment of the present invention. In the third embodiment, the integrated controller for a vehicle is provided with the antiskid braking device and an automatic braking device. The structure of the automatic braking device is the same as in the first embodiment shown in FIGS. 1 to 3.

In FIG. 22, a vehicle according to the present embodiment has a structure in which left and right front wheels 311 and 312 are driven wheels, left and right rear wheels 313 and 314 are driving wheels, and the output torque of an engine 315 is transmitted from an automatic transmission 316 to the left and right rear wheels 313 and 314 through a propeller shaft 317, a differential gear 318, and left and right drive shafts 319 and 320.

The wheels 311 to 314 include braking devices 6a to 6d (which are the same as the braking device 6 shown in FIGS. 1 and 2). Each of the braking devices 6a to 6d has a disc 26 which is rotated Integrally with each of the wheels 311 to 314, and a caliper 27 for braking the rotation of the disc 26 on receipt of a braking pressure.

A braking control system for operating the braking devices 6a to 6d includes a master vac 1 for increasing the operating force of a brake pedal 2 generated by a driver, and a master cylinder 3 for generating a braking pressure corresponding to the operating force increased by the master vac 1. A braking pressure feeding line 329 for front wheels extended from the master cylinder 3 branches out into a braking pressure feeding line 329a for a left front wheel and a braking pressure feeding line 329b for a right front wheel, and is connected to the caliper 27 of each of the braking devices 6a and 6b on the front wheel side. The braking pressure feeding line 329a includes a first valve unit 5a which has an electromagnetic switching valve 330a and an electromagnetic relief valve 330b. The braking pressure feeding line 329b includes a second valve unit 5b which has an electromagnetic switching valve 331a and an electromagnetic relief valve 331b.

A braking pressure feeding line 332 for rear wheels extended from the master cylinder 3 includes a third valve unit 5c which has an electromagnetic switching valve 333a and an electromagnetic relief valve 333b. The braking pressure feeding line 332 branches out into a braking pressure feeding line 332a for a left rear wheel and a braking pressure feeding line 332b for a right rear wheel on the downstream side of the third valve unit 5c, and is connected to the caliper 27 of each of the braking devices 6c and 6d on the rear wheel side.

According to the present embodiment, there are provided first, second and third channels. The first channel adjusts the braking pressure of the braking device 6a of the left front wheel 311 by the operation of the first valve unit 5a. The second channel adjusts the braking pressure of the braking device 6b of the right front wheel 312 by the operation of the second valve unit 5b. The third channel adjusts the braking pressures of the braking devices 6c and 6d of the left and right rear wheels 313 and 314 by the operation of the third valve unit 5c. These channels are controlled independently of one another. The first to third valve units 5a to 5c are shown as an ABS valve unit 5 in FIG. 2. In FIG. 1, the valve unit 5 connected to the braking device 6 for each wheel has a 3-port 2-position switching valve 21. In FIG. 22, the valve units 5a to 5c are formed by the switching valves 330a, 331a and 333a and the relief valves 330b, 331b and 333b in place of the switching valve 21. The valve unit 5 has the same function as those of the valve units 5a to 5c.

An ABS control unit 334 for controlling the first to third channels receives a braking signal and a wheel speed signal. The braking signal is outputted from a braking sensor 335 for detecting that the brake pedal 2 is operated and the operating speed of the brake pedal 2. The wheel speed signal is outputted from wheel speed sensors 337 to 340 for detecting the rotational speeds of the wheels 311 to 314, The ABS control unit 334 outputs braking pressure control signals corresponding to the braking and wheel speed signals to the first to third valve units 5a to 5c. Consequently, braking control for the slip of the left and right front wheels 311 and 312, and the left and right rear wheels 313 and 314, that is, ABS control is independently carried out for each channel. More specifically, the control unit 334 controls the switching valves 330a, 331a and 333a and relief valves 330b, 331b and 333b (or the switching valve 21 having the same function) of the first to third valve units 5a to 5c by duty control based on wheel speeds which are indicated by wheel speed signals from the wheel speed sensors 337 to 340. Consequently, a braking force is applied to the front wheels 311 and 312 and the rear wheels 313 and 314 at a braking pressure corresponding to a state of slip. Braking oil discharged from the relief valves 330b, 331b and 333b of the first to third valve units 5a to 5c is returned to a reserve tank 3a of the master cylinder 3 by a drain line (not shown).

In a state of ABS non-braking, a braking pressure control signal is not outputted from the control unit 334. As shown, accordingly, the relief valves 330b, 331b and 333b and switching valves 330a, 331a and 333a of the first to third valve units 5a to 5c are held in closing and opening positions, respectively. Consequently, the braking pressures generated by the master cylinder 3 depending on the operating force of the brake pedal 2 are fed to the braking devices 6a to 6d of the left and right front wheels 311 and 312 and the left and right rear wheels 313 and 314 through the braking pressure feeding lines 329 and 332 for front and rear wheels. Braking forces corresponding to these braking pressures are directly applied to the front wheels 311 and 312 and the rear wheels 313 and 314.

Figure 23:
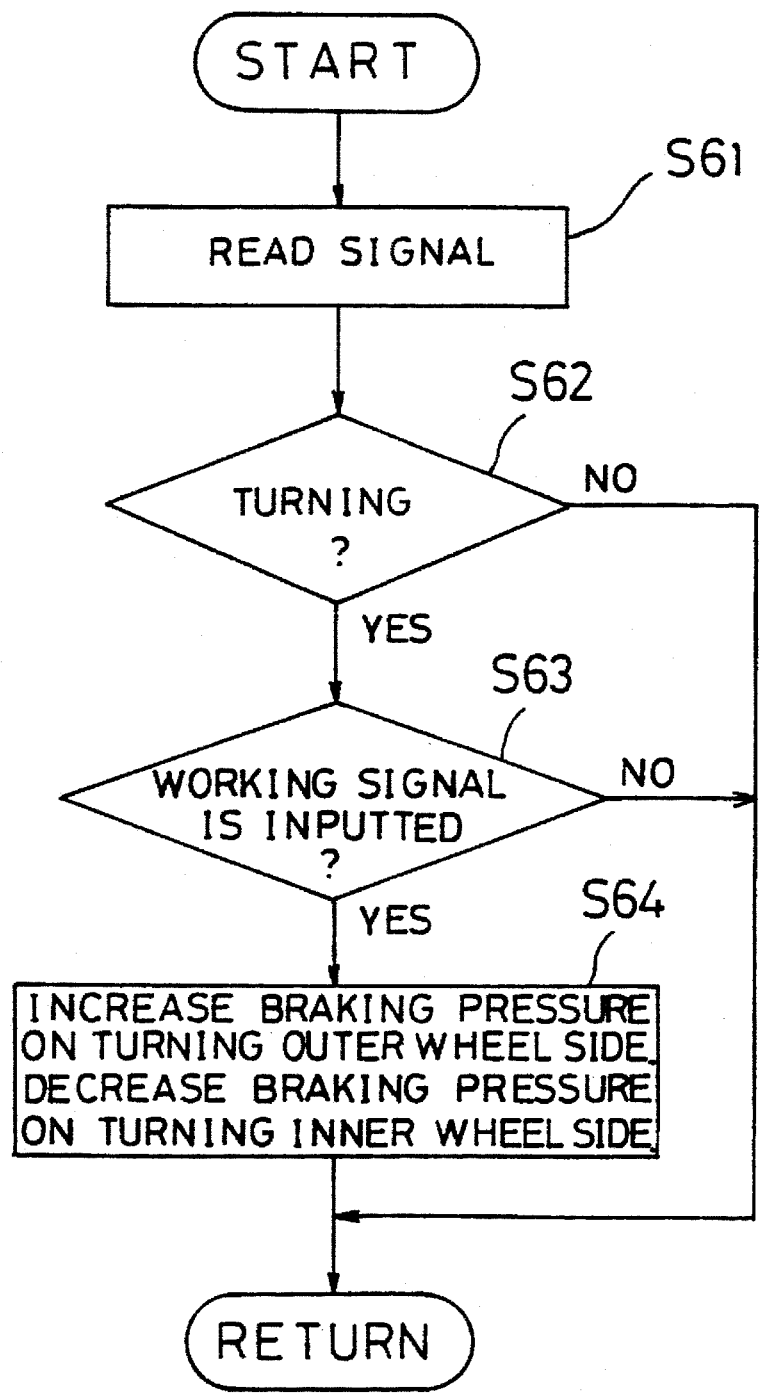

The present invention is characterized in that the ABS control unit 334 receives a detection signal from a steering angle sensor 41 for detecting a steering angle and a working signal outputted from the control unit 45 as the control part of the automatic braking device when performing automatic braking so that a steering characteristic is changed and controlled by the ABS control unit 334. This control is carried out according to control flow shown in FIG. 23.

At Step S61, various signals are first read. At Step S62, it is decided whether the vehicle is turning based on a steering angle signal from the steering angle sensor 41. If decision is YES, that is, the vehicle is turning, it is decided whether a working signal is inputted from the control unit 45, that is, automatic braking is carried out at Step S63. When automatic braking is carried out, there is increased the braking pressure of the braking device 6a or 6b of the front wheel 311 or 312 which is a turning outer wheel, or decreased the braking pressure of the braking device 6b or 6a of the front wheel 312 or 311 which is a turning inner wheel. Consequently, the steering characteristic is changed and controlled in the under-steer direction on the safe side. If decision is NO in Step S62 or S63, this routine returns.

According to the third embodiment, when the vehicle is turning and automatic braking is applied to the vehicle by the operation of the automatic braking device, under the control of the ABS control unit 334 is increased the braking pressure of the braking device 6a or 6b of the front wheel 311 or 312 which is a turning outer wheel or decreased the braking pressure of the braking device 6b or 6a of the front wheel 312 or 311 which is a turning inner wheel. In this case, if the road friction coefficients $\mu$ are almost equal to each other on the left and right wheels, a difference is also made between braking forces operated on the ground points of the left and right front wheels 311 and 312 depending on a difference between braking pressures. For this reason, the steering characteristic of the vehicle is changed in the under-steer direction in which a turning radius is gradually increased. Consequently, it is possible to prevent the vehicle from cutting into the turning inside so as to cause spin. Thus, running stability can be enhanced. In addition, the change control of the steering characteristic is performed by the ABS control unit 334 almost simultaneously with the operation of the automatic braking device on receipt of a working signal from the control unit 45 of the automatic braking device. Consequently, it is possible to effectively enhance running stability by the change in the under-steer direction.

Figure 24:
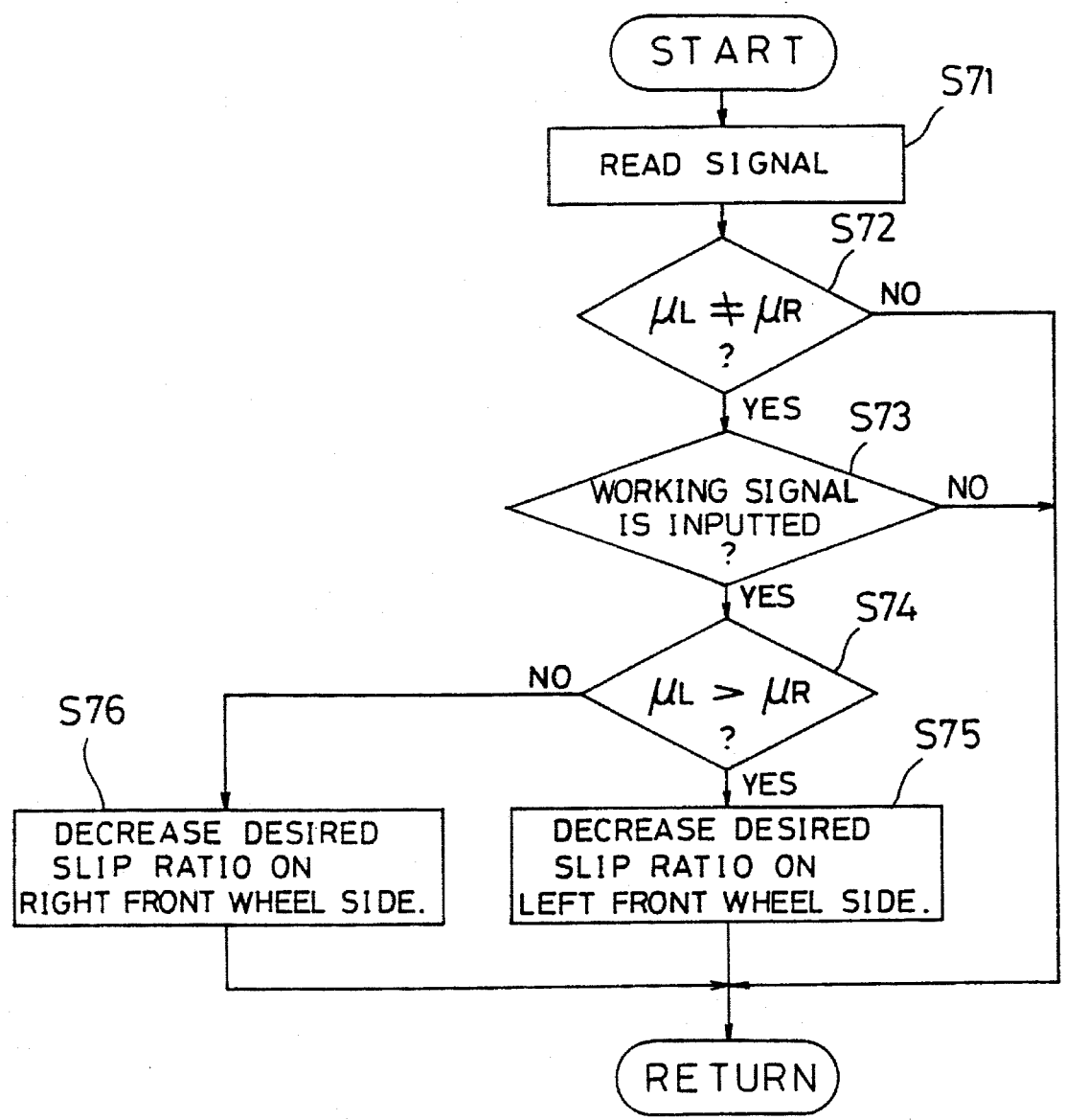

FIG. 24 shows a variant of the change control of a steering characteristic. The change control of the steering characteristic is performed to enhance running stability in case automatic braking is carried out when a vehicle having an automatic braking device and an ABS device is running on a road on which left and right wheels have different road friction coefficients. The structure of the automatic braking device is the same as in the first embodiment shown in FIGS. 1 to 3. The structure of the ABS device is the same as in the third embodiment shown in FIG. 22. An ABS control unit 334 receives a detection signal and a working signal. The detection signal is outputted from each of a plurality of road $\mu$ sensors 44 (see FIG. 3) for detecting a road friction coefficient for each wheel in place of the steering angle sensor 41 in the third embodiment. The working signal is outputted from a control unit 45 as the control part of the automatic braking device when automatic braking is performed. Based on these signals, the change control of the steering characteristic is carried out.

At Step S71, various signals are first read. At Step S72, it is decided whether a road friction coefficient $\mu L$ on the left wheel side is different from a road friction coefficient $\mu R$ on the right wheel side based on the detection signal from the road $\mu$ sensor 44. If decision is YES, that is, the vehicle is turning, it is decided whether a working signal is inputted from the control unit 45, that is, automatic braking is performed at Step S73. When automatic braking is performed, it is decided whether the road friction coefficient $\mu L$ is greater than the road friction coefficient $\mu R$ at Step S74. If the road friction coefficient $\mu L$ is greater than the road friction coefficient $\mu R$, the desired slip ratio of the braking device 6a for the left front wheel is decreased at Step S75. Then, this routine returns. If the road friction coefficient $\mu L$ is not greater than the road friction coefficient $\mu R$, the desired slip ratio of the braking device 6b for the right front wheel is decreased at Step S76. Then, this routine returns.

Figure 25:
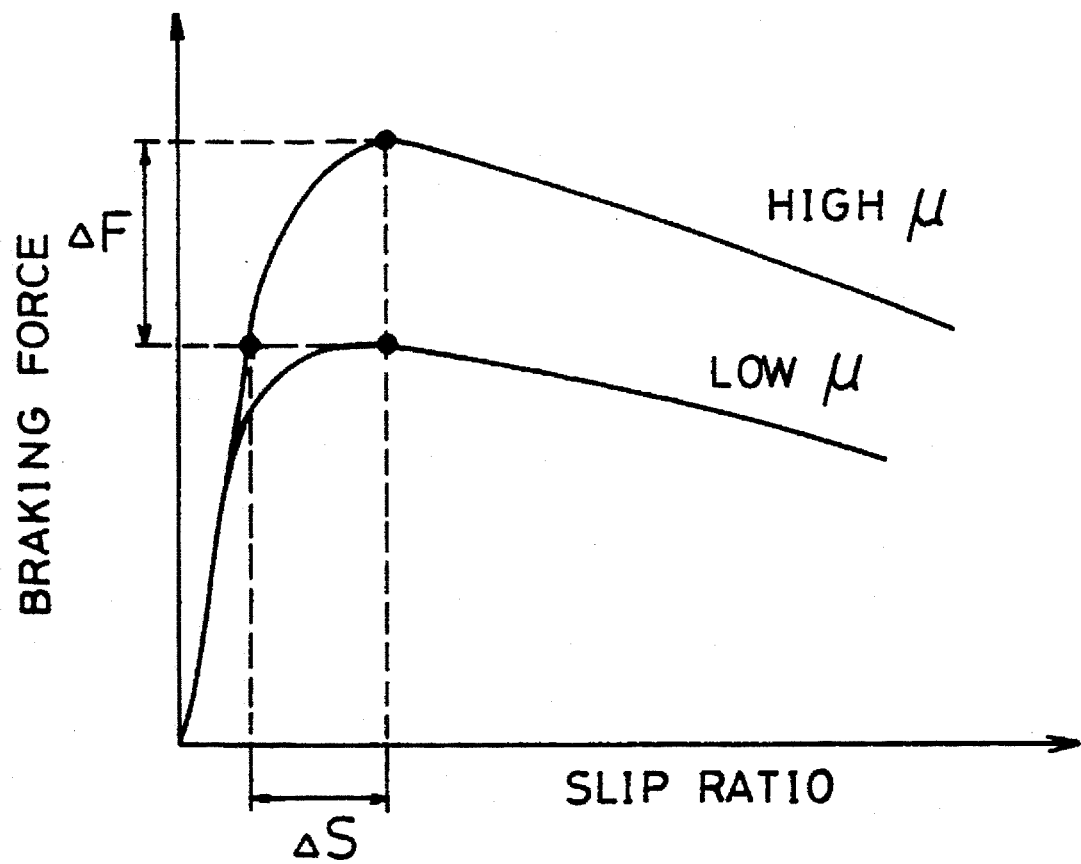

According to the above-mentioned control, in case automatic braking is performed when the vehicle is running on a road on which left and right wheels have different road friction coefficients, the desired slip ratio of the braking device 6a or 6b for the front wheel on the high $\mu$ side is made smaller than that of the braking device 6b or 6a for the front wheel on the low $\mu$ side. When a braking pressure is applied so that the slip ratios of the braking devices 6a and 6b for the left and right front wheels are equal to each other, a braking force has a difference $\Delta F$ between wheels on the high and low $\mu$ sides as shown in FIG. 25. However, when the braking pressure of the braking device 6a or 6b for the front wheel on the high $\mu$ side is decreased to lower the slip ratio by $\Delta S$, the braking forces operated on the ground points of the left and right front wheels 311 and 312 are almost equal to each other. Consequently, it is possible to prevent the spin of the vehicle from being caused by the difference between the braking forces. Thus, running stability can be enhanced.

Figure 26:
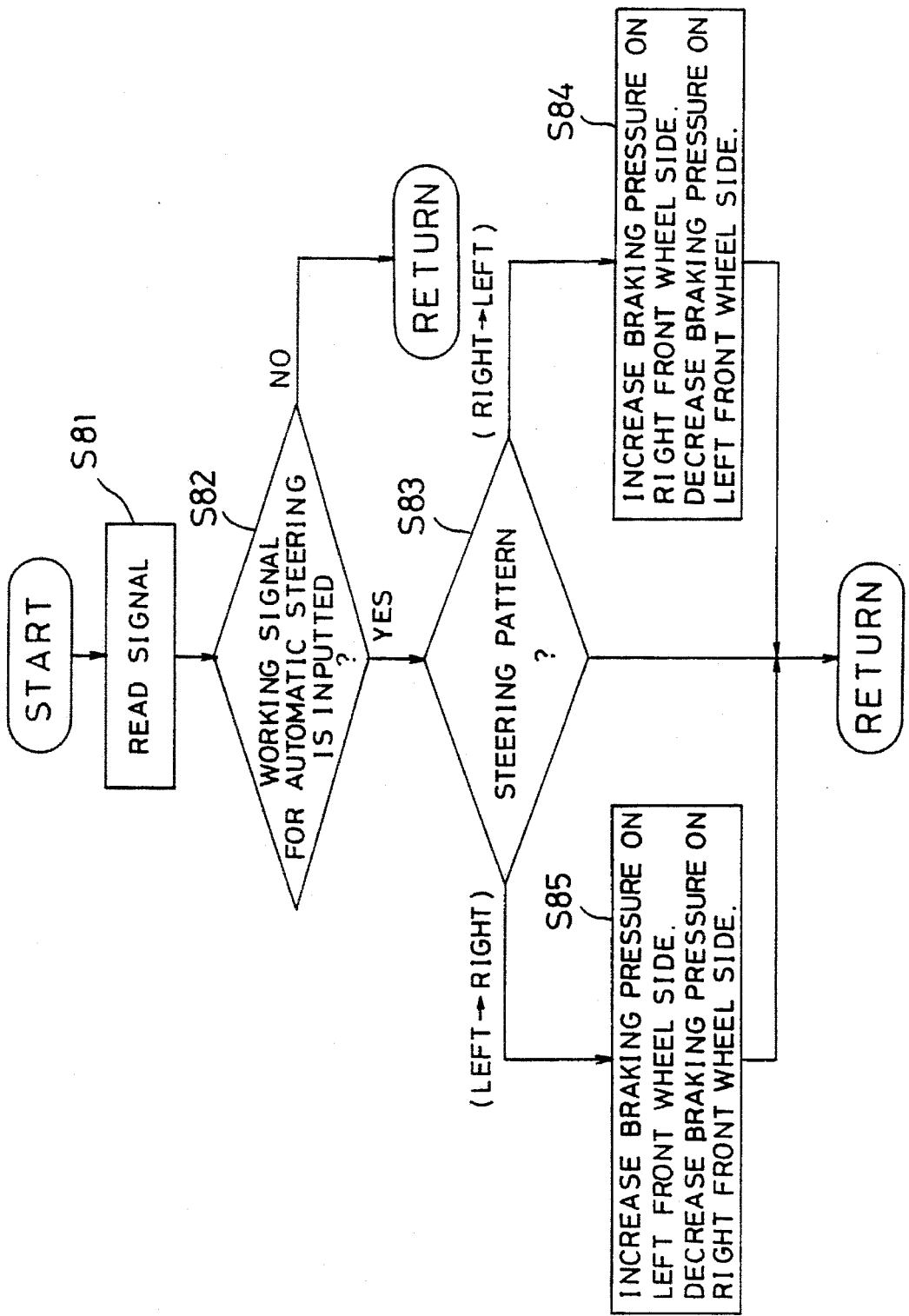

FIG. 26 shows another variant of the change control of a steering characteristic. The change control of the steering characteristic is performed to enhance contact prevention when automatic steering is carried out in a vehicle having an automatic steering device and an ABS device. The structure of the automatic steering device is the same as in the second embodiment shown in FIGS. 15. The structure of the ABS device is the same as in the third embodiment shown in FIG. 22. An ABS control unit 334 receives a working signal outputted from a control unit 257 as the control part of the automatic steering device when automatic steering is carried out. Based on the working signal, the change control of the steering characteristic is performed.

At Step S81, various signals are first read. At Step S82, it is decided whether a working signal is inputted from the control unit 257. If decision is YES, it is decided whether a steering pattern is changed from right to left (Step S43 in FIG. 16 is executed) or from left to right (Step S44 in FIG. 16 is executed) at Step S83. In the former case, the braking pressure of the braking device 6b on the right front wheel side is increased or that of the braking device 6a on the left front wheel side is decreased at Step S84 so as to change the steering characteristic in the over-steer direction at the time of right turning. Then, this routine returns. In the latter case, the braking pressure of the braking device 6a on the left front wheel side is increased or that of the braking device 6b on the right front wheel side is decreased at Step S85 so as to change the steering characteristic in the over-steer direction at the time of left turning. Then, this routine returns. The change of the steering characteristic in the over-steer direction implies that the steering characteristic having an under-steer tendency is weakened.

According to the above-mentioned control, in case automatic steering is performed to prevent the vehicle from coming in contact with a forward obstacle, there is increased the braking pressure of the braking device 6a or 6b on the front wheel side which is the inside in the turning direction when starting automatic steering, or decreased the braking pressure of the braking device 6b or 6a on the front wheel side which is the outside in the turning direction. In this case, if the road friction coefficients μ of the left and right wheels are almost equal to each other. There is also caused a difference between braking forces operated on the ground points of left and right front wheels 311 and 312 depending on a difference between the braking pressures. For this reason, the steering characteristic of the vehicle is changed in the over-steer direction when starting automatic steering. Consequently, it is sufficient that an amount of steering for preventing the vehicle from coming in contact with the forward obstacle is small. Accordingly, it is possible to reduce the time for automatic steering so that contact prevention can be ensured. In addition, it is possible to make a cylinder 256 as an actuator for automatic steering and the like small-sized.

The change control of the steering characteristic is performed almost simultaneously with the operation of the automatic steering device on receipt of a working signal from the control unit of the automatic steering device. Consequently, it is possible to effectively enhance contact prevention by the change in the over-steer direction.

Figure 27:
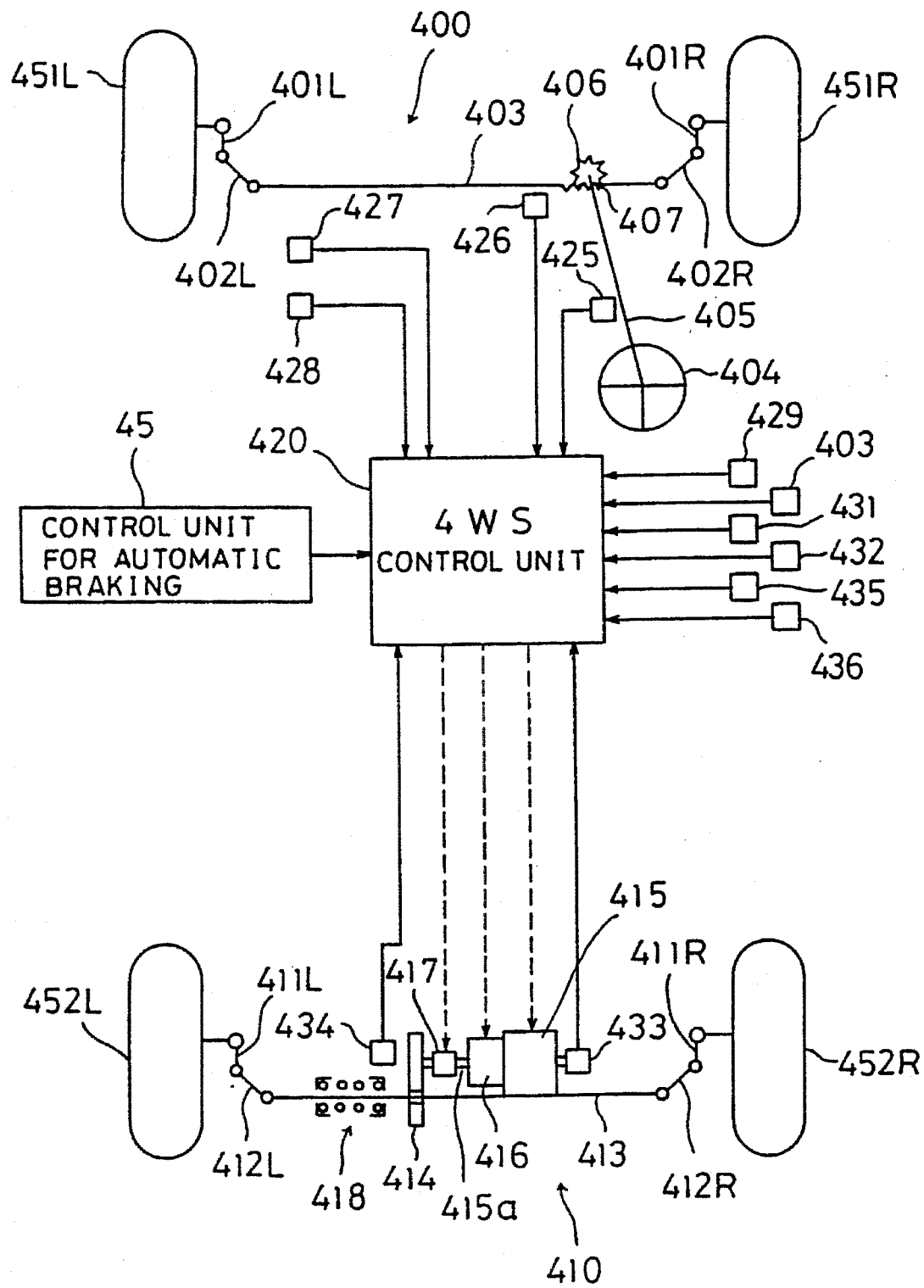
FIGS. 27 to 30 show a fourth embodiment.

FIG. 27 shows a four wheel steering device forming one of components of an integrated controller for a vehicle according to a fourth embodiment of the present invention. In the fourth embodiment, the integrated controller for a vehicle is provided with the four wheel steering device and an automatic braking device. The structure of the automatic braking device is the same as in the first embodiment shown in FIGS. 1 to 3.

In FIG. 27, the reference numeral 400 denotes a front wheel steering device for steering left and right front wheels 451L and 451R, and the reference numeral 410 denotes a rear wheel steering device for steering left and right rear wheels 452L and 452R.

The front wheel steering device 400 includes a pair of left and right knuckle arms 401L and 401R, a pair of left and right tie rods 402L and 402R, and a front wheel steering rod 403 for connecting the tie rods 402L and 402R. The reference numeral 404 denotes a steering wheel. A pinion 406 is provided on the lower end of a shaft 405 of the steering wheel 404. The pinion 406 is engaged with a rack 407 which is formed on the front wheel steering rod 403. The front wheel steering rod 403 is laterally moved to steer the front wheels 451L and 451R depending on the operation of the steering wheel 404.

The rear wheel steering device 410 includes a pair of left and right knuckle arms 411L and 411R, a pair of left and right tie rods 412L and 412R, and a rear wheel steering rod 413 in similar to the front wheel steering device 400. The rear wheel steering rod 413 is connected to a decelerating mechanism 414. The decelerating mechanism 414 is connected to an output shaft 415a of a servo motor 415. When the servo motor 415 is rotated and driven, the rear wheel steering rod 413 is laterally moved through the decelerating mechanism 414 so as to steer the rear wheels 452L and 452R.

In the rear wheel steering device 410, an electromagnetic brake 416 is provided on the output shaft 415a of the servo motor 415. When the electromagnetic brake 416 is operated, the output shaft 415a and the rear wheel steering rod 413 are locked to hold the rear wheels 452L and 452R in a state of steering. An electromagnetic clutch 417 is provided between the output shaft 415a and the decelerating mechanism 414. A position return mechanism 418 is provided on the rear wheel steering rod 413. The position return mechanism 418 serves to return the rear wheel steering rod 413 to a neutral position. At the time of abnormal rear wheel steering, the electromagnetic clutch 417 is opened to disconnect the servo motor 415 from the rear wheel steering rod 413 so that the rear wheel steering rod 413 is returned to the neutral position by the position return mechanism 418. Consequently, the rear wheels 452L and 452R are placed in a neutral position in which a steering angle is zero.

The reference numeral 420 denotes a 4WS control unit for controlling a rear wheel steering angle. The 4WS control unit 420 basically controls the servo motor 415 and the electromagnetic brake 416. Detection signals are inputted from various sensors 425 to 436 to the 4WS control unit 420. The reference numeral 425 denotes a steering angle sensor. The reference numeral 426 denotes a front wheel steering angle sensor for detecting a front wheel steering angle based on the moving amount of the front wheel steering rod 403. The reference numerals 427 and 428 denote speed sensors. The reference numeral 429 denotes a neutral clutch switch for detecting the N (neutral) position of a manual transmission and the time of the operation of a clutch pedal. The reference numeral 430 denotes an inhibitor switch for detecting the N or P (parking) position of an automatic transmission. The reference numeral 431 denotes a brake switch for detecting the time of the operation of the brake pedal. The reference numeral 432 denotes an engine switch for detecting the time of engine operation. The reference numeral 433 denotes a rotational angle sensor for detecting the rotational angle of the servo motor 415. The reference numeral 434 denotes a rear wheel steering angle sensor for detecting a rear wheel steering angle by the moving amount of the rear wheel steering rod 413.

Figure 28:
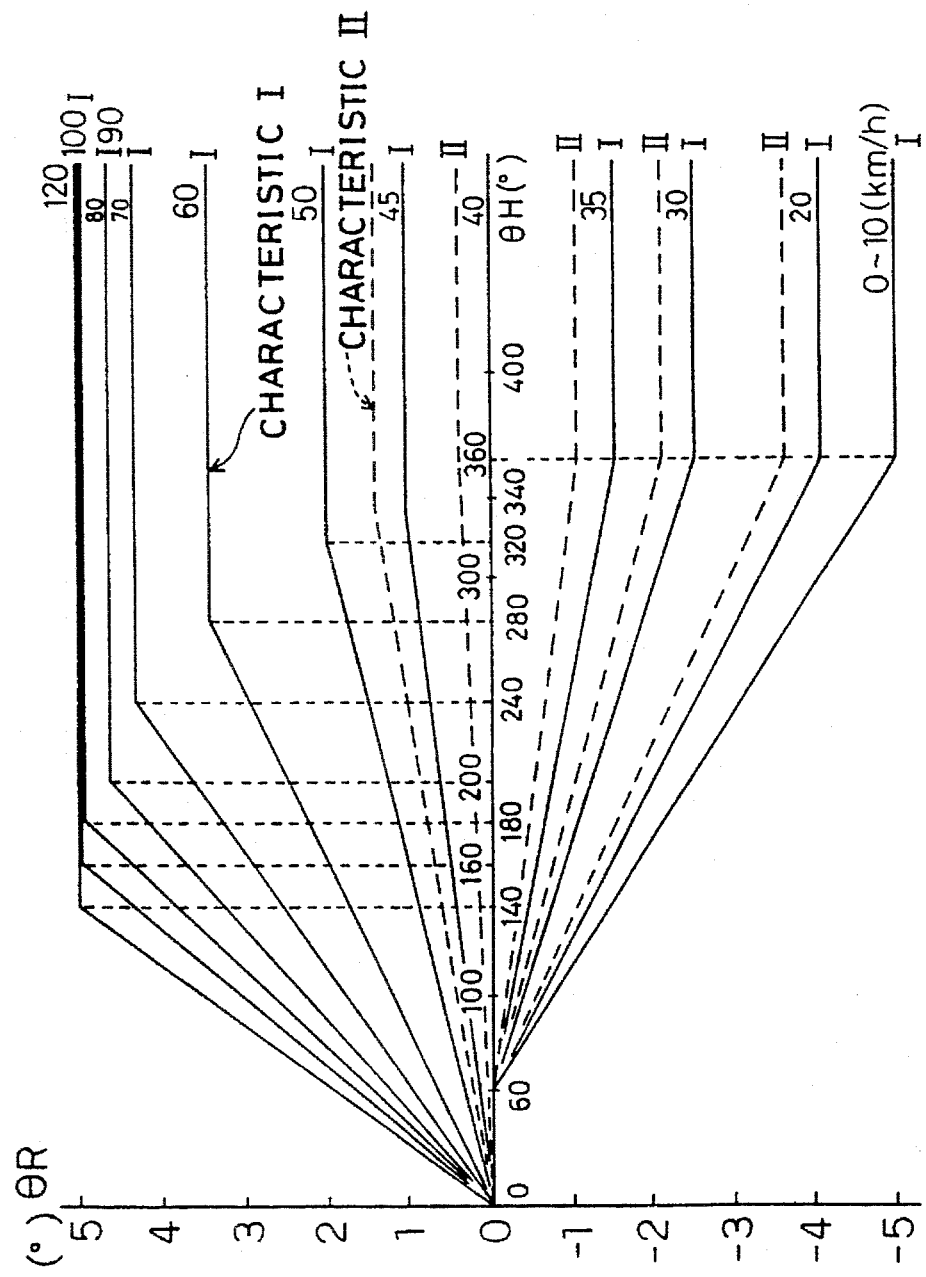
Figure 29:
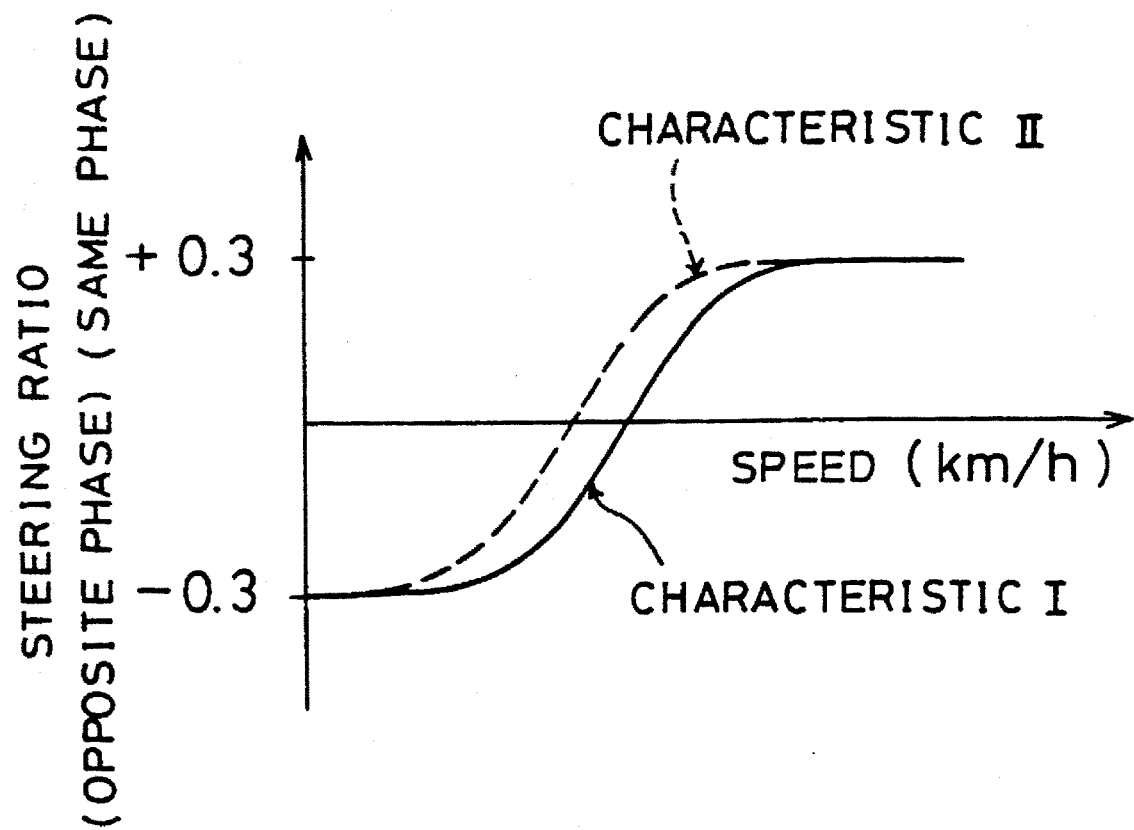

In the 4WS control unit 420 are prestored rear wheel steering ratio characteristics shown in FIGS. 28 and 29. Referring to the steering ratio characteristics shown in FIGS. 28 and 29, a rear wheel steering ratio (i.e., a rear wheel steering angle θR/a front wheel steering angle θF, where the front wheel steering angle θF is proportional to a steering angle θH) is changed depending on a speed, and a phase is changed from the opposite side to the same side when the speed is transferred from LOW to HIGH. In FIGS. 28 and 29, a characteristic I is shown by a solid line and a characteristic II is shown by a broken line. The characteristic II is set to a characteristic in which the steering ratio of the same speed is closer to the same phase side than the characteristic I. The characteristic I is used for the normal control of the 4WS control unit 420. The characteristic II is used for the change control of the steering characteristic which is performed based on a working signal from the control unit 45 of an automatic steering device to be described below.

Figure 30:
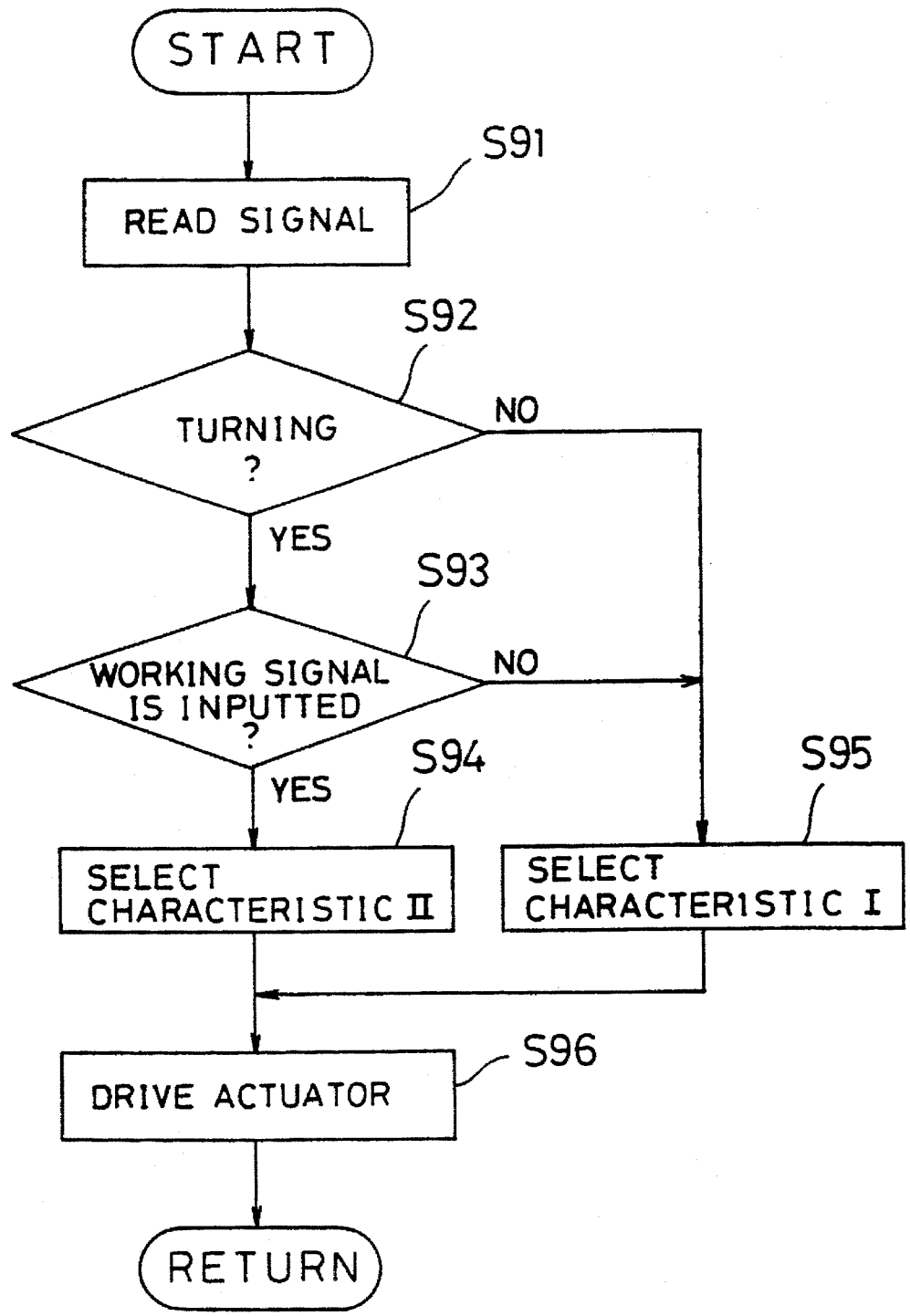

The present invention is characterized in that the 4WS control unit 420 receives a working signal so as to perform the change control of a steering characteristic. The working signal is outputted from the control unit 45 as the control part of the automatic braking device when performing automatic braking. This control is carried out according to control flow shown in FIG. 30.

At Step S91, various signals are first read. At Step S92, it is decided whether the vehicle is turning based on a steering angle signal from the steering angle sensor 425. If decision is YES, that is, the vehicle is turning, it is decided whether a working signal is inputted from the control unit 45. That is, automatic braking is performed at Step S93. If automatic braking is performed, the characteristic II shown in FIGS. 28 and 29 is selected at Step S94. At Step S96, the servo motor 415 as the actuator of the rear wheel steering device is driven based on the characteristic II. Then, this routine returns. If decision is NO in Step S92 or S93, the characteristic I shown in FIGS. 28 and 29 is selected at Step S95. At Step S96, the servo motor 415 of the rear wheel steering device is operated based on the characteristic I. Then, this routine returns.

According to the fourth embodiment, in case the vehicle is turning and automatic braking is applied to the vehicle by the operation of the automatic braking device, the 4WS control unit 420 performs control to select the characteristic II which is closer to the same phase side than the characteristic I at the time of normal steering. When the servo motor 415 is operated based on the characteristic II, the left and right rear wheels 452L and 452R are steered to the same phase side as the steering direction of the left and right front wheels 451L and 451R so that the steering characteristic of the vehicle is changed in the under-steer direction. Consequently, it is possible to prevent the vehicle from cutting into the turning inside so as to cause spin. As a result, running stability can be enhanced. In addition, the change control of the steering characteristic is performed by the 4WS control unit 420 almost simultaneously with the operation of the automatic braking device on receipt of the working signal from the control unit 45 of the automatic braking device. Thus, running stability can be enhanced more effectively by the change in the under-steer direction.

FIGS. 31 to 36 show a toe control device forming one of components of an integrated controller for a vehicle according to a fifth embodiment of the present invention. In the fifth embodiment, the integrated controller for a vehicle is provided with the toe control device and an automatic braking device. The structure of the automatic braking device is the same as in the first embodiment shown in FIGS. 1 to 3.

Figure 31:
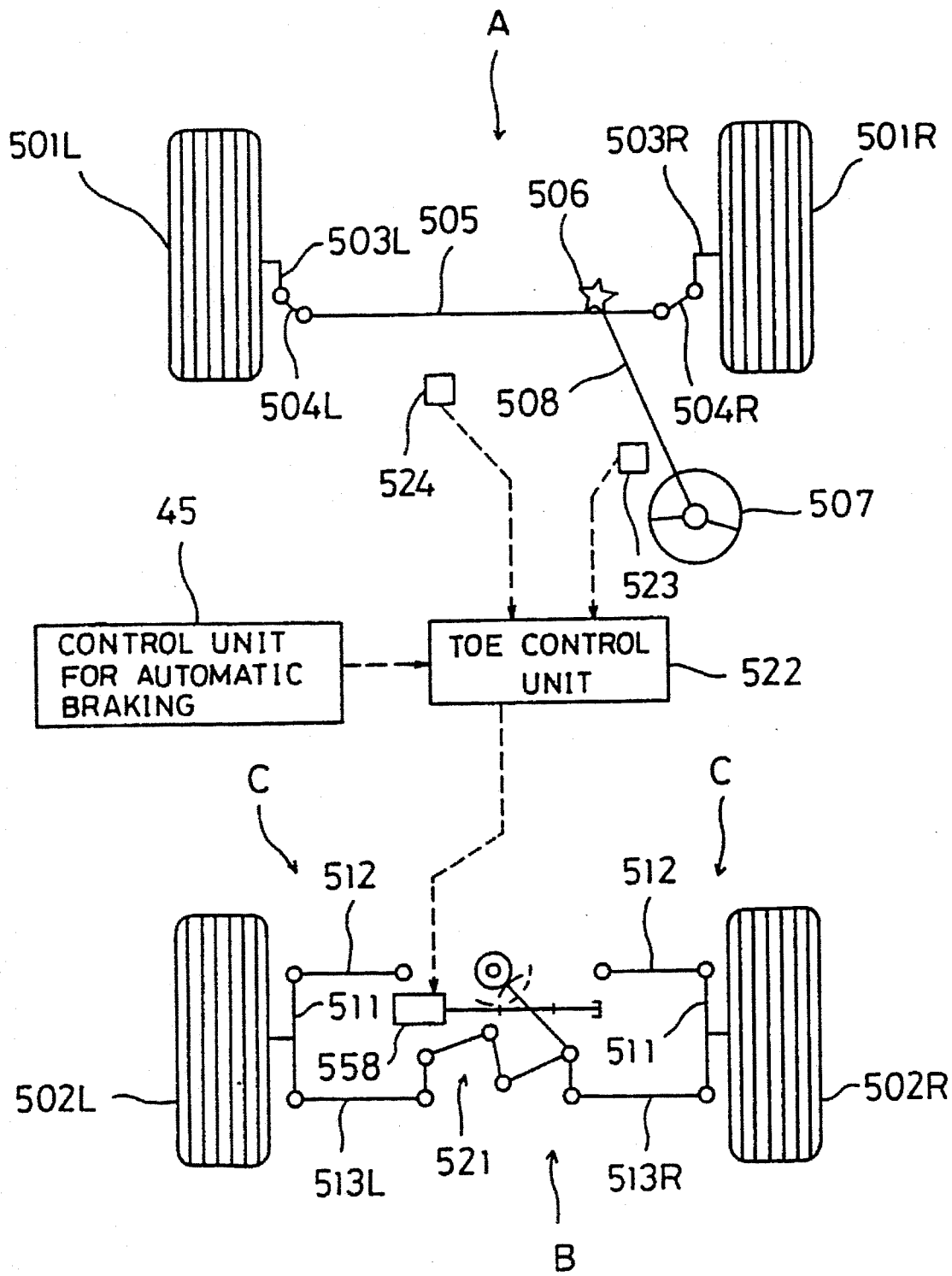
FIGS. 31 to 38 show a fifth embodiment.
Figure 32:
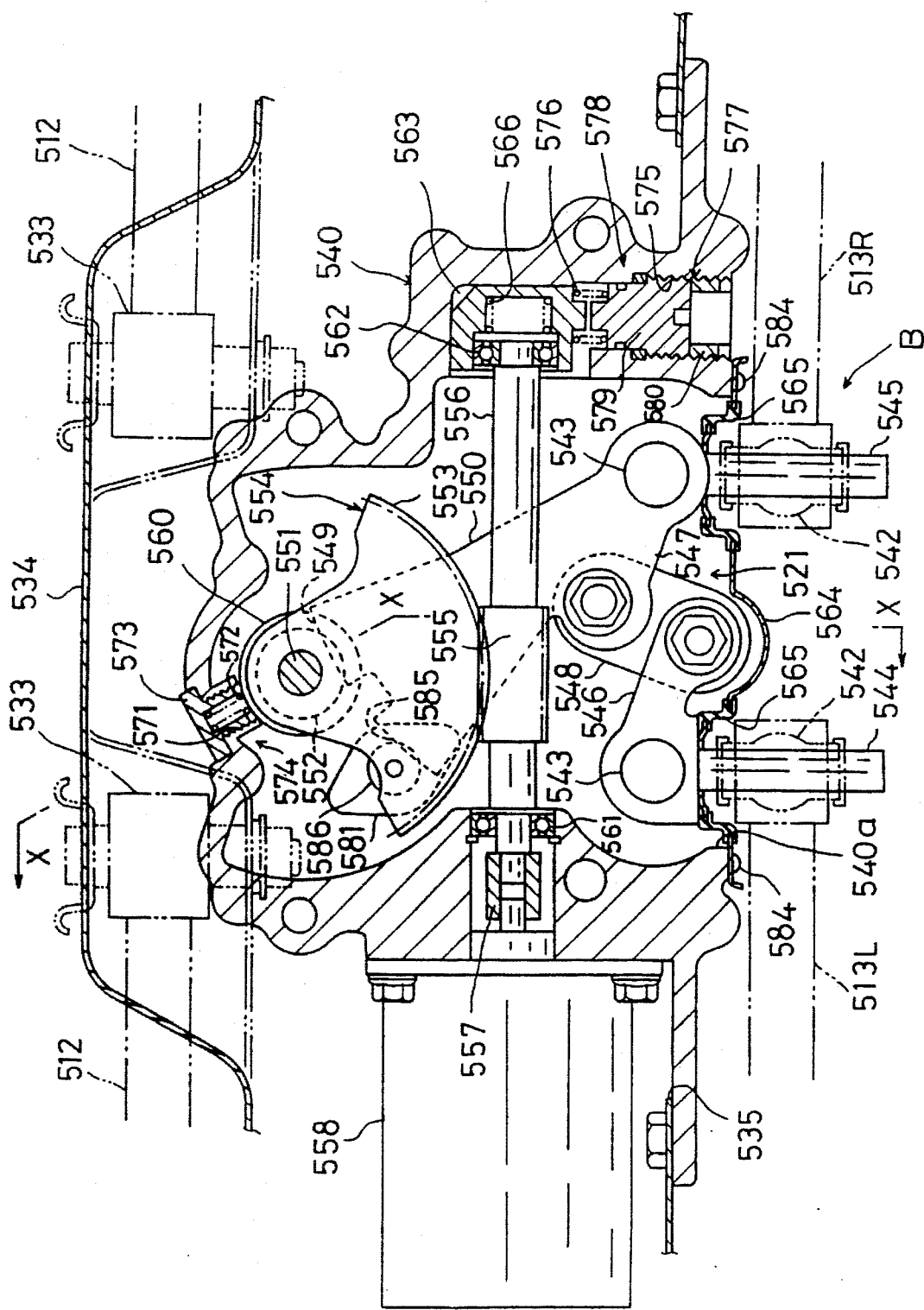
Figure 33:
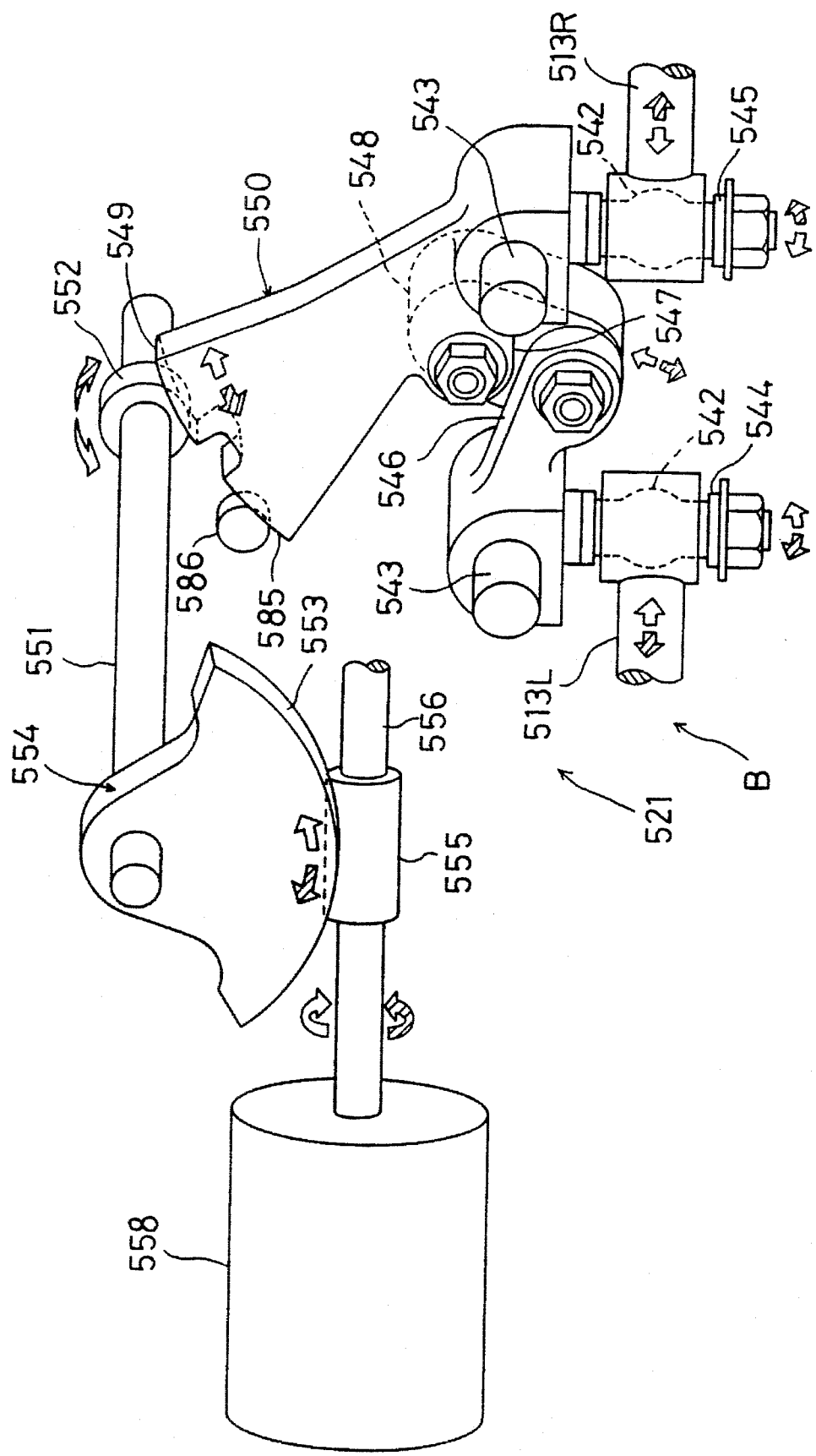
Figure 34:
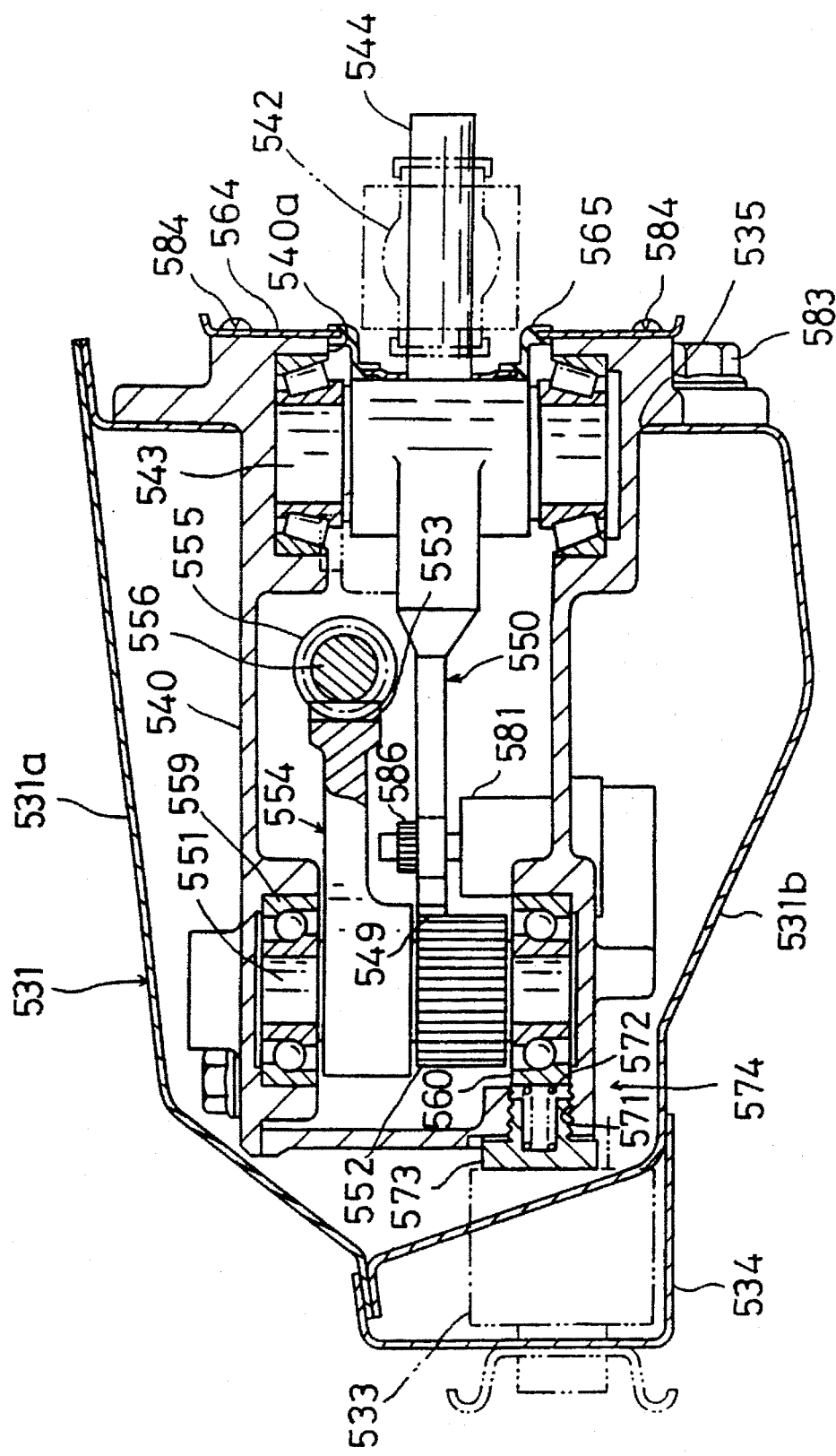
Figure 35:
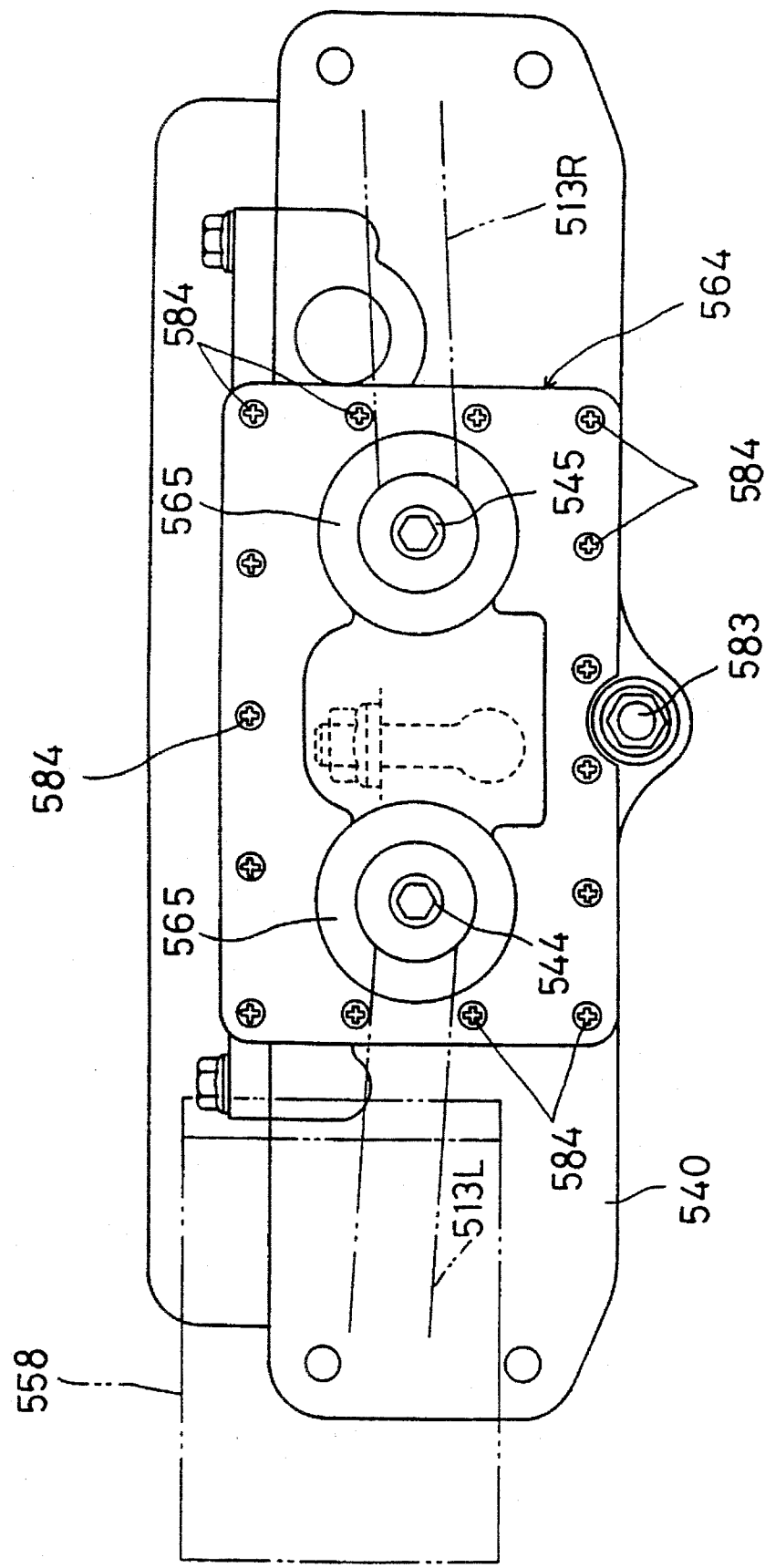
Figure 36:
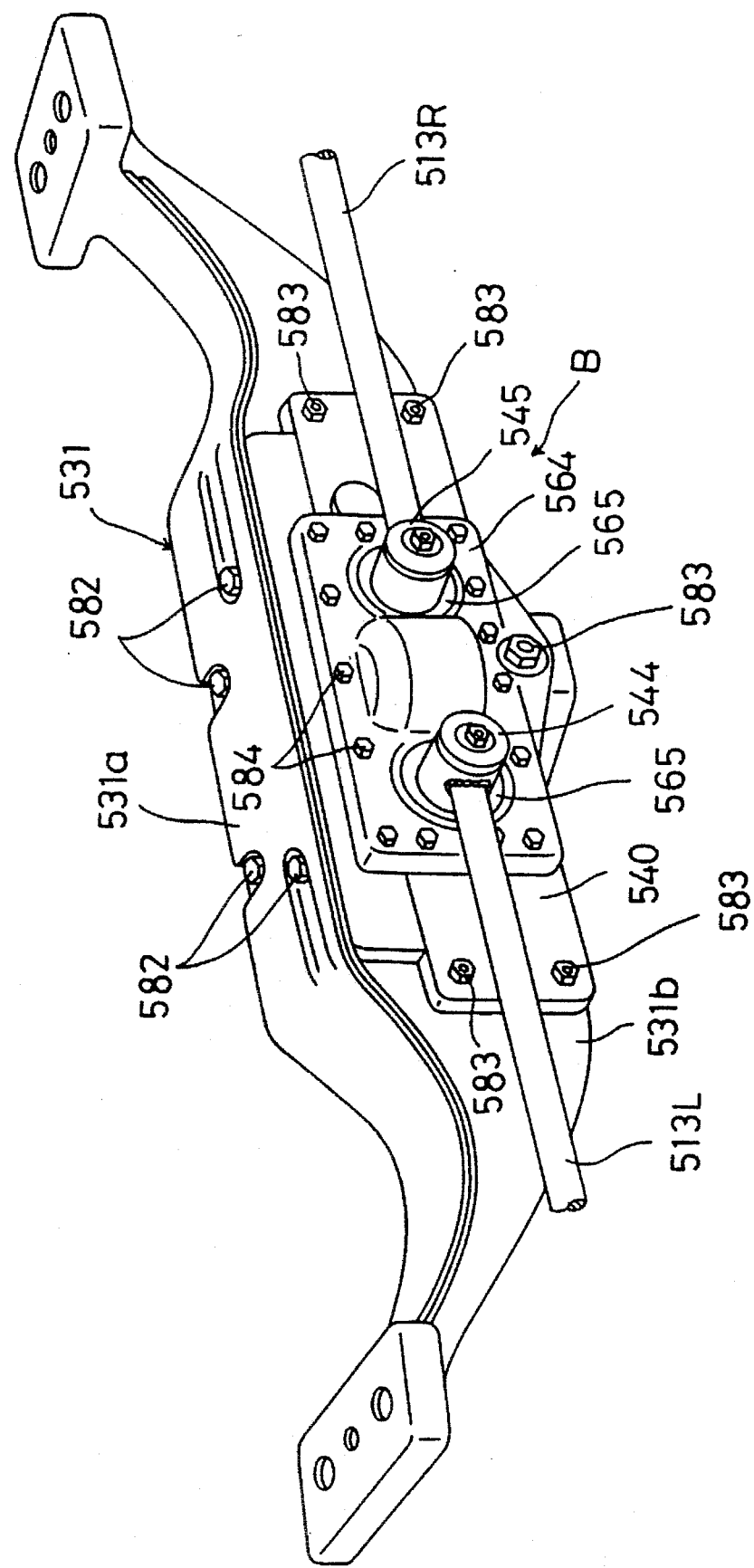

In FIG. 31, the reference designation A denotes a front wheel steering device for steering left and right front wheels 501L and 501R, and the reference designation B denotes a toe control device for changing the toe angles of left and right rear wheels 502L and 502R.

The front wheel steering device A includes a pair of left and right knuckle arms 503L and 503R, a pair of left and right tie rods 504L and 504R, a relay rod 505 for connecting the tie rods 504L and 504R, and a steering shaft 508. The steering shaft 508 has a pinion 506 provided on one of ends and a steering wheel 507 provided on the other end. The pinion 506 is engaged with rack teeth (not shown) formed on the relay rod 505. The relay rod 505 is displaced in the direction of a car width by the handling operation of the steering wheel 507 so that the left and right front wheels 501L and 501R are steered in the same direction.

The left and right rear wheels 502L and 502R are provided on a body through suspension devices C, respectively. The suspension device C includes a wheel supporting member 511, and a pair of front and left lateral rinks 512 and 513L (or 513R). The wheel supporting members 511 serve to rotatably support the rear wheels 502L and 502R. The lateral rinks 512 and 513L (or 513R) function as suspension arm members for connecting the front and rear ends of the wheel supporting member 511 to the body side.

The toe control device B includes a drive mechanism 521 and a toe control unit 522. The drive mechanism 521 is connected to the body side ends of the left and right rear lateral rinks 513L and 513R for displacing the same in the axial direction (in the direction of a car width) so as to symmetrically steer the left and right rear wheels 502L and 502R in the toe-in or toe-out direction. The toe control unit 522 forms a control part for controlling the drive mechanism 521 (more specifically, the operation of a drive motor 558 to be described below).

Figure 37:
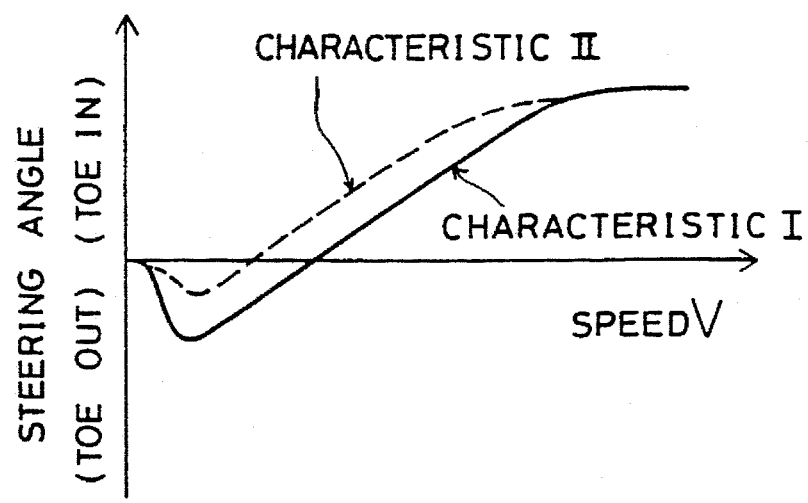

The reference numeral 523 denotes a handle steering angle sensor for detecting a handle steering angle. The reference numeral 524 denotes a speed sensor for detecting a speed. Signals outputted from the sensors 523 and 524 are inputted to the toe control unit 522. The control of the drive mechanism 521 is performed depending on a speed V by the toe control unit 522 as shown in FIG. 37. When the speed is low, the rear wheels 502L and 502R are steered in the toe-out direction. When the speed is intermediate or high, the rear wheels 502L and 502R are steered in the toe-in direction. A characteristic I shown by a solid line in FIG. 37 is used for the normal control of the toe control unit 522. A characteristic II shown by a broken line in FIG. 37 is used for the change control of a steering characteristic performed based on a working signal from the control unit 45 of the automatic steering device. The characteristic II is set to a characteristic in which the steering ratio of the same speed is closer to the same phase side than the characteristic I.

The specific structure of the drive mechanism 521 is shown in FIGS. 32 to 36.

In FIGS. 32 to 36, the reference numeral 531 denotes a cross member as a body strength member provided in the direction of a car width. The cross member 531 forms an almost rectangular closed section together with an upper panel 531a and a lower panel 531b. The body side ends of the left and right front lateral rinks 512 are connected to the front side of the cross member 531 through elastic bushes 533 so as to swing up and down. In addition, a cover member 534 for covering the elastic bush 533 is fixed to the front side of the cross member 531. An opening 535 is provided on the rear wall of the cross member 531. The drive mechanism 521 having the unit construction of the toe control device B is inserted into the cross member 531 through the opening 535.

The drive mechanism 521 includes left and right supporting members 544 and 545, a left lever 546, a right lever 547, a rink member 548, an arm 550, a first toothed wheel 552, a second toothed wheel 554, a third toothed wheel 555, a transmission shaft 556, and a drive motor 558. The supporting members 544 and 545 have rear ends individually connected to the body side ends of the left and right rear lateral rinks 513L and 513R through spherical joint members 542, and front ends rotatably supported on a housing 540 through supporting shafts 543 which vertically extend. The rear ends of the supporting members 544 and 545 project backward from the opening 535 on the rear wall of the cross member 531. The left lever 546 is almost rectangular in section and horizontally extends obliquely backward toward the body inner side (the right lever 547 side to be described below) seen on a plane from the front end of the left supporting member 544. The right lever 547 is almost rectangular in section and horizontally extends obliquely forward toward the body inner side (the left lever 546 side) as seen on a plane from the front end of the right supporting member 545. The left and right levers 546 and 547 extend opposite to each other. The rink member 548 has its both ends rotatably connected to the tip ends of the levers 546 and 547, and connects the levers 546 and 547. The arm 550 horizontally extends obliquely forward (as compared with the right lever 547) from the front end of the right supporting member 545 toward the body inner side, and has a gear 549 formed on a tip end face thereof. The body inner side is opposite to the side on which the rear lateral rink member 513R is provided. The first toothed wheel 552 is engaged with a gear 549 of the arm 550 and has a shaft 551 which extends vertically. The second toothed wheel 554 is a worm wheel which has its base end fixed to a position on the shaft 551 above the first toothed wheel 552 so as to be rotated synchronously with the first toothed wheel 552 and has a gear 553 formed on the tip end side thereof. The third toothed wheel 555 is a worm gear engaged with the gear 553 of the second toothed wheel 554. The transmission shaft 556 has the third toothed wheel 555 provided in an almost middle portion thereon, and its right end rotatably supported on the housing 540. The drive motor 558 is connected to the left end of the transmission shaft 556 through a connecting member 557 and can reciprocally be rotated as an actuator to rotate and drive the transmission shaft 556 on its left end.

The shaft 551 of the first toothed wheel 552 has its upper and lower ends rotatably supported on the housing 540 through first and second bearings 559 and 560 respectively. The transmission shaft 556 has its left end rotatably supported on the housing 540 through a third bearing 561 in a position which is closer to the third toothed wheel 555 than the connecting member 557, and its right end rotatably supported on the housing 540 through a fourth bearing 562 and a holding member 563 which holds the fourth bearing 562. On the holding member 563 is provided a spring 566 for urging the transmission shaft 556 to the drive motor 558 side in the axial direction.

The housing 540 is fixed to the upper and lower faces (upper and lower panels 531a and 531b) of the cross member 531 with bolts 582 in respective four corners, and is also fixed to the cross member 531 with bolts 583 in five portions on the periphery of the opening 535 of the rear wall. In the normal condition in which the left and right rear wheels 502L and 502R are not steered, the rink member 548 is connected to the levers 546 and 547 almost perpendicularly to each other. The transmission shaft 556 connects the second toothed wheel 554 and the drive motor 558 so that power can be transmitted, and is provided between the second toothed wheel 554 and the left supporting member 544 with an axis in the direction of a car width. A hole 540a is provided on the rear face of the housing 540. A blocking member 564 is provided on the hole 540a with screws 584 and serves to block the hole 540a on the back side. The rear ends of the supporting members 544 and 545 which project from the blocking member 564 backward are sealed by the blocking member 564 through rubber sealing members 565 so that the supporting members 544 and 545 can be moved with respect to the blocking member 564.

Figure 38:
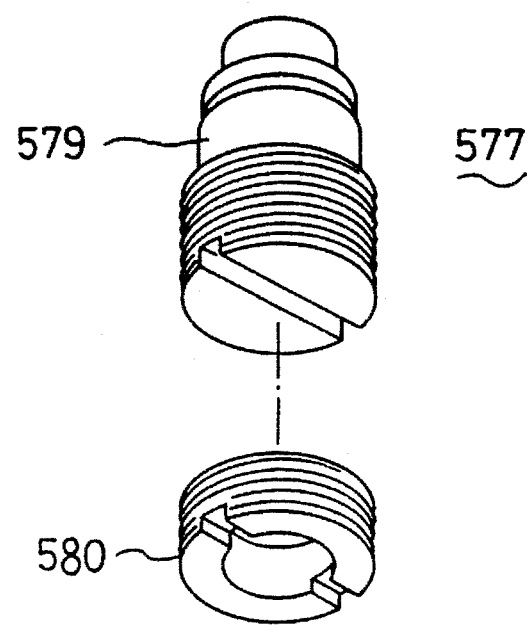

In the vicinity of the second bearing 560, there is provided first urging means 574 for urging the first toothed wheel 552 to the gear 549 side of the arm 550 in the direction perpendicular to the shaft 551 of the first toothed wheel 552. The first urging means 574 has a screw hole 571, an adjusting member 573 and a spring 572. The screw hole 571 is provided in a position in which the gear 549 of the arm 550 is opposite to the housing 540 with the shaft 551 of the first toothed wheel 552 and the second bearing 560 held therebetween. The adjusting member 573 is fitted in the screw hole 571 and has a hole portion which is formed toward the second bearing 560. The spring 572 is contracted between the bottom of the hole portion of the adjusting member 573 and the second bearing 560. By adjusting a position in which the adjusting member 573 is fitted in the screw hole 571, the force of the spring 572, that is, the urging force of the urging means 574 can be adjusted. In the vicinity of the holding member 563, there is provided second urging means 578 for urging the third toothed wheel 555 to the gear 553 of the second toothed wheel 554 in the direction perpendicular to the shaft (transmission shaft 556) of the third toothed wheel 555. The second urging means 578 has a screw hole 575, an adjusting member 577 and a spring 576 in similar to the first urging member 574. The screw hole 575 is provided in a position in which the gear 553 of the second toothed wheel 554 is opposite to the housing 540 with the transmission shaft 556 and the holding member 563 held therebetween. The adjusting member 577 is fitted in the screw hole 575. The spring 576 is contracted between the adjusting member 577 and the holding member 563. By adjusting a position in which the adjusting member 577 is fitted in the screw hole 575, the force of the spring 576, that is, the urging force of the urging means 578 can be adjusted. As shown in FIG. 38, the adjusting member 577 is provided with front and rear members 579 and 580. The front member 579 has an opposed face for contracting the spring 576 together with the holding member 563. The rear member 580 holds the front member 579 on the back face side thereof.

The reference numeral 581 denotes a rotational angle sensor as rotational angle detecting means for detecting the rotational angle of the second toothed wheel 554. The rotational angle sensor 581 is attached to the housing 540 in a position close to the first toothed wheel 552, and has a toothed wheel 586 so as to detect the rotational angle of the second toothed wheel 554 based on that of the toothed wheel 586. The toothed wheel 586 is engaged with a gear 585 formed on the tip end face of the arm 550.

In the drive mechanism 521 of the toe control device B, when the drive motor 558 is operated, its power is transmitted to the arm 550 through the transmission shaft 556, third toothed wheel 555, second toothed wheel 554 and first toothed wheel 552. Consequently, the arm 550 and supporting member 545 swing on a horizontal plane around the supporting shaft 543. With swing, the rear lateral rink 513R of the right rear wheel 502R is displaced in the axial direction, that is, the direction of a car width, and the rear lateral rink 513L of the left rear wheel 502L is displaced in the direction of a car width by power received from the right lever 547 of the supporting member 545 through the rink member 548, left lever 546 and left supporting member 544. Consequently, the left and right rear wheels 502L and 502R are symmetrically steered. The rear wheels 502L and 502R are always steered depending on a speed V based on the control of the toe control unit 522 according to the characteristic I shown in FIG. 37. When the speed is low, the transmission shaft 556, arm 550, rink member 548, left and right levers 546 and 547, left and right supporting members 544 and 545, and left and right rear lateral rinks 513L and 513R of the drive mechanism 521 are rotated in the directions of white arrows shown in FIG. 33 so that the rear wheels 502L and 502R are steered in the toe-out direction. Consequently, the turning properties of a vehicle can be enhanced. When the speed is intermediate or high, the transmission shaft 556, arm 550, rink member 548, left and right levers 546 and 547, left and right supporting members 544 and 545, and left and right rear lateral rinks 531L and 513R are rotated in the directions of slash arrows shown in FIG. 33 so that the rear wheels 502L and 502R are steered in the toe-in direction. Consequently, the stability of the vehicle can be enhanced.

The present invention is characterized in that the toe control unit 522 receives a working signal outputted from the control unit 45 as the control part of the automatic braking device when performing automatic braking so that a steering characteristic is changed and controlled by the toe control unit 522. This control is performed according to control flow shown in FIG. 30 in similar to the fourth embodiment.

At Step S91, various signals are first read. At Step S92, it is decided whether the vehicle is turning based on a steering angle signal from the steering angle sensor 523. If decision is YES, that is, the vehicle is turning, it is decided whether a working signal is inputted from the control unit 45, that is, automatic braking is performed at Step S93. If automatic braking is performed, the characteristic II shown in FIG. 37 is selected at Step S94. At Step S96, the drive motor 558 as the actuator of the toe control device is operated based on the characteristic II. Then, this routine returns. If decision is NO in Step S92 or S93, the characteristic I shown in FIG. 37 is selected at Step S95. At Step S96, the drive motor 558 of the toe control device is operated based on the characteristic I. Then, this routine returns.

According to the fifth embodiment, in case the vehicle is turning and automatic braking is applied to the vehicle by the operation of the automatic braking device, the toe control unit 522 performs control to select the characteristic II which is closer to the toe-in side than the characteristic I at the time of normal steering in similar to the fourth embodiment. When the drive motor 558 is operated based on the characteristic II, the left and right rear wheels 502L and 502R are steered in the toe-in direction as compared with normal steering so that the steering characteristic of the vehicle is changed in the under-steer direction. Consequently, it is possible to prevent the vehicle from cutting into the turning inside so as to cause spin. As a result, running stability can be enhanced. In addition, the change control of the steering characteristic is performed by the control unit 522 almost simultaneously with the operation of the automatic braking device on receipt of a working signal from the control unit 45 of the automatic braking device. Thus, running stability can be enhanced more effectively by the change in the under-steer direction.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. An integrated controller for a vehicle comprising:

a contact preventive device for detecting a distance between a vehicle and an obstacle and a relative speed, and deciding whether the vehicle may come in contact with the obstacle based on the results of detection so as to perform a contact preventive operation, and characteristic changing means for causing a suspension or steering characteristic of the vehicle to be changed, wherein said characteristic changing means includes a control part which receives information from a control part of said contact preventive device and changes the suspension characteristic or the steering characteristic so as to prevent unstable behavior of the vehicle in response to the contact preventive operation of said contact preventive device.

2. The integrated controller for a vehicle according to claim 1, wherein the characteristic changing means is an active suspension device for feeding and discharging a fluid to and from cylinders provided between a body and wheels so that the suspension characteristic can be changed.

3. The integrated controller for a vehicle according to claim 1, wherein the characteristic changing means is an antiskid braking device for performing control so as to independently operate the braking devices of at least two wheels on left and right sides.

4. The integrated controller for a vehicle according to claim 1, wherein the characteristic changing means is a four wheel steering device for simultaneously steering front and rear wheels.

5. The integrated controller for a vehicle according to claim 1, wherein the characteristic changing means is a toe control device for causing the toe angle of a rear wheel to be changed.

6. The integrated controller for a vehicle according to claim 2, wherein the contact preventive device automatically applies a braking force to each wheel so as to prevent contact, and the control part of the active suspension device increases a control gain when automatic braking is performed by the operation of the contact preventive device.

7. The integrated controller for a vehicle according to claim 2, wherein the contact preventive device automatically steers steering wheels so as to prevent contact, and the control part of the active suspension device changes the suspension characteristic so as to inhibit the vehicle from being rolled when automatic steering is performed by the operation of the contact preventive device.

8. The integrated controller for a vehicle according to claim 2, wherein the active suspension device includes a cylinder provided between a body and each wheel, a hydraulic pump which communicates with a hydraulic chamber of said cylinder through a hydraulic passage, a control valve provided on the hydraulic passage for controlling the feed and discharge of a hydraulic pressure to and from said cylinder, and a control part for controlling the positional switching of said control valve.

9. The integrated controller for a vehicle according to claim 3, wherein the contact preventive device automatically applies a braking force to each wheel so as to prevent contact, and the control part of the antiskid braking device changes the steering characteristic of the vehicle in the under-steer direction when the vehicle is turning and automatic braking is performed by the operation of the contact preventive device.

10. The integrated controller for a vehicle according to claim 3, wherein the contact preventive device automatically applies a braking force to each wheel so as to prevent contact, and the control part of the antiskid braking device makes the braking forces of left and right wheels almost equal to each other when the vehicle is running on a road on which the left and right wheels have different road friction coefficients and automatic braking is performed by the operation of the contact preventive device.

11. The integrated controller for a vehicle according to claim 8, wherein the contact preventive device automatically steers steering wheels so as to prevent contact, and the control part of the antiskid braking device changes the steering characteristic of the vehicle in the over-steer direction when automatic steering is performed by the operation of the contact preventive device.

12. The integrated controller for a vehicle according to claim 3, wherein the antiskid braking device includes a plurality of braking devices provided on wheels, a master cylinder for generating a braking pressure corresponding to the operating force of a brake pedal, a plurality of control valves provided on communicating passages of said braking devices to said master cylinder for adjusting the braking pressures of said braking devices, and a control part for controlling said control valves.

13. The integrated controller for a vehicle according to claim 4, wherein the contact preventive device automatically applies a braking force to each wheel so as to prevent contact, and the control part of the four wheel steering device steers rear and front wheels onto the same phase side in the same direction so as to change the steering characteristic of the vehicle in the under-steer direction when the vehicle is turning and automatic braking is performed by the operation of the contact preventive device.

14. The integrated controller for a vehicle according to claim 4, wherein the four wheel steering device includes a rear wheel steering device for steering left and right rear wheels, said rear wheel steering device having a steering rod which extends in the direction of a car width and is connected to the left and right rear wheels so that steering can be performed, an actuator for moving said steering rod in the axial direction, and a control part for controlling the operation of said actuator.

15. The integrated controller for a vehicle according to claim 5, wherein the contact preventive device automatically applies a braking force to each wheel so as to prevent contact, and the control part of the toe control device displaces rear wheels in the toe-in direction so as to change the steering characteristic of the vehicle in the under-steer direction when automatic braking is performed by the operation of the contact preventive device.

16. The integrated controller for a vehicle according to claim 5, wherein left and right rear wheels are supported on a body through wheel supporting members and a pair of front and rear lateral rinks, and the toe control device includes a drive mechanism connected to the body side end of the lateral rink for each wheel for displacing the lateral rink in the direction of a car width, and a control part for controlling said drive mechanism.

17. The integrated controller for a vehicle according to claim 6, wherein an automatic braking device as a contact preventive device includes a braking device provided on each wheel, a hydraulic circuit for adjusting the braking pressure of said braking device separately from the operation of a brake pedal, distance and relative speed detecting means for detecting a distance between a vehicle and an obstacle and a relative speed, and a control part for deciding whether the vehicle may come in contact with the obstacle based on the results of detection and controlling said hydraulic circuit so as to increase the braking pressure of said braking device when there is a possibility of contact.

18. The integrated controller for a vehicle according to claim 7, wherein an automatic steering device as a contact preventive device includes a rod which extends in the direction of a car width and is connected to left and right steering wheels so that steering can be performed, a cylinder for moving said rod in the axial direction, a hydraulic circuit for controlling the operation of said cylinder, distance and relative speed detecting means for detecting a distance between a vehicle and an obstacle and a relative speed, and a control part for deciding whether the vehicle may come in contact with the obstacle based on the results of detection and controlling said hydraulic circuit so as to steer the steering wheels by the operation of said cylinder when there is a possibility of contact.

* * * * *